US012778734B2

(12) United States Patent
Zhou et al.

(10) Patent No.: US 12,778,734 B2
(45) Date of Patent: Nov. 3, 2026

(54) METHOD AND SYSTEM FOR DETECTING SOW ESTRUS UTILIZING MACHINE VISION

(71) Applicant: THE CURATORS OF THE UNIVERSITY OF MISSOURI, Columbia, MO (US)

(72) Inventors: Jianfeng Zhou, Columbia, MO (US); Ziteng Xu, Columbia, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 0 days.

(21) Appl. No.: 18/868,042

(22) PCT Filed: May 31, 2023

(86) PCT No.: PCT/US2023/067670
§ 371 (c)(1),
(2) Date: Nov. 21, 2024

(87) PCT Pub. No.: WO2023/235735
PCT Pub. Date: Dec. 7, 2023

(65) Prior Publication Data

US 2025/0318917 A1 Oct. 16, 2025

Related U.S. Application Data

(60) Provisional application No. 63/365,554, filed on May 31, 2022.

(51) Int. Cl.

*A61D 17/00* (2006.01)
*G06V 10/12* (2022.01)
(Continued)

(52) U.S. Cl.
CPC .......... *A61D 17/002* (2013.01); *G06V 10/12* (2022.01); *G06V 10/26* (2022.01); *G06V 20/50* (2022.01);
(Continued)

(58) Field of Classification Search
CPC ...... A61D 17/002; G06V 10/12; G06V 10/26; G06V 20/50; G06V 20/64; G06V 40/10;
(Continued)

(56) References Cited

U.S. PATENT DOCUMENTS 3,970,775 A * 7/1976 Lemelson .............. G06K 7/084
5,474,085 A * 12/1995 Hurnik .................. G01N 33/12
600/587
(Continued)

FOREIGN PATENT DOCUMENTS

CN 102499687 A 6/2012
CN 203555015 U 4/2014
(Continued)

OTHER PUBLICATIONS

The Curators of the University of Missouri, PCT/US2023/067670, filed May 31, 2023, "The International Search Report and the Written Opinion of the International Searching Authority, or the Declaration", mailed Jan. 5, 2024.

*Primary Examiner* — Oommen Jacob
(74) *Attorney, Agent, or Firm* — McKee, Voorhees & Sease PLC

(57) ABSTRACT

Accurate estrus detection of sows is critical to achieving a high farrowing rate and maintaining good reproductive performance. However, the conventional method of estrus detection uses a back pressure test by farmers, which is time-consuming and labor-intensive with a significant degree of error. This disclosure is of an automated estrus detection method by monitoring the change in vulva swell-
(Continued)

ing around the estrus using a three-dimensional measurement device, e.g., LiDAR camera, which includes an RGB camera and a depth camera. This sow estrus detection improves accuracy and efficiency, reduces labor and cost, and improves the sustainability of swine production using a data-driven decision-making system based on a robotic cyber-physical system (CPS) that can utilize deep learning detection based on a deep learning model.

15 Claims, 26 Drawing Sheets

(51) Int. Cl.

| | |
|---|---|
| ***G06V 10/26*** | (2022.01) |
| ***G06V 20/50*** | (2022.01) |
| ***G06V 20/64*** | (2022.01) |
| ***G06V 40/10*** | (2022.01) |

(52) U.S. Cl.
CPC .............. *G06V 20/64* (2022.01); *G06V 40/10* (2022.01); *G06V 2201/03* (2022.01)

(58) Field of Classification Search
CPC .. G06V 2201/03; G06V 10/764; G06V 40/23; G06V 20/653; A61B 5/0816; A61B 5/0077; A61B 5/1128; A61B 2503/40; A61B 5/4318; A61B 5/7267
See application file for complete search history.

(56) References Cited

U.S. PATENT DOCUMENTS

| | | | | |
|---|---|---|---|---|
| 2008/0228058 | A1* | 9/2008 | Cinti | A61D 17/002 600/551 |
| 2008/0273760 | A1* | 11/2008 | Metcalfe | A01K 29/00 382/110 |
| 2010/0324437 | A1* | 12/2010 | Freeman | A61B 5/085 600/529 |
| 2012/0048207 | A1* | 3/2012 | Hofman | B25J 9/0096 119/670 |
| 2013/0302024 | A1* | 11/2013 | Eckert | G08B 13/1963 396/427 |
| 2018/0042584 | A1* | 2/2018 | Biondi | A61B 5/7253 |
| 2018/0071069 | A1* | 3/2018 | Mikkelsen | A01K 29/005 |
| 2020/0060240 | A1* | 2/2020 | Yajima | A01K 13/00 |
| 2020/0125849 | A1* | 4/2020 | Labrecque | G06T 7/0008 |
| 2020/0296935 | A1* | 9/2020 | Ashek | A01K 29/005 |
| 2020/0367807 | A1 | 11/2020 | Lassoued et al. | |
| 2021/0333755 | A1 | 10/2021 | Lin et al. | |
| 2023/0057738 | A1* | 2/2023 | Labrecque | A01K 29/005 |
| 2025/0318917 | A1* | 10/2025 | Zhou | A61B 5/1128 |

FOREIGN PATENT DOCUMENTS

| | | | | |
|---|---|---|---|---|
| CN | 109977755 A | | 7/2019 | |
| CN | 114403044 A | * | 4/2022 | G06N 3/045 |
| KR | 102117092 B1 | * | 5/2020 | A01K 29/005 |

* cited by examiner

METHOD AND SYSTEM FOR DETECTING SOW ESTRUS UTILIZING MACHINE VISION

CROSS REFERENCE TO RELATED APPLICATION

This application is a US National Phase application filed under 35 U.S.C. § 371 and claims priority to International Application No. PCT/US2023/067670, filed May 31, 2023, and is herein incorporated by reference in its entirety, including without limitation, the specification, claims, and abstract, as well as any figures, tables, appendices, or drawings thereof.

This application, as well as International Application No. PCT/US2023/067670, also claims priority under 35 U.S.C. § 119 to provisional patent application U.S. Ser. No. 63/365,554 filed May 31, 2022. This provisional patent application is herein incorporated by reference in its entirety, including without limitation, the specification, claims, and abstract, as well as any figures, tables, appendices, or drawings thereof.

FIELD OF THE INVENTION

The present invention generally relates to an accurate estrus detection of sows that is critical to achieving a high farrowing rate and maintaining good reproductive performance. More particularly, but not exclusively, the present invention relates to utilizing machine vision technology to detect vulva size changes around estrus in swine, which can be used to detect the on-site estrus of sows.

BACKGROUND OF THE INVENTION

Pork production in the U.S. has an estimated $23.4 billion annual gross output with 115 million hogs, provides income for more than 60,000 pork producers, and supports about 550,000 jobs (National Pork Producers Council, 2022). Current management practices in swine production rely heavily on skilled workers, who spend long hours in hazardous environments and interacting with animals, often at higher biosecurity risk and significantly impacting workers' mental and physical health. The unpleasant working conditions make it hard to hire local workers but rely on immigrants, resulting in additional uncertainty. Several states showed signs of difficulties in hiring dependable employees to work on swine farms from the local labor market, and such labor shortage in swine farming is expected to grow continuously. Animal production may suffer significant losses when there is no sufficient workforce. For example, the COVID-19 pandemic has caused a tremendous impact on livestock production due to human health issues and safety measures. A 36% drop in the U.S. barrow and gilt slaughter was observed in May 2020 compared to the same time the previous year. Achieving timely and accurate estrus detection is critical to a swine breeding farm's success. On average, estrus lasts one to three days in sows, with ovulation occurring two-thirds of the way through the estrous cycle. Due to the longevity of the sperm and eggs, insemination that occurs too early or too late relative to ovulation can lead to lower conception rates, lower farrowing rate, and smaller litter sizes, which are the main reasons for replacing a postpartum sow.

Piglets born alive per litter typically increase as parity increases until it starts slowly decreasing after the fourth parity, and the net return on investment in sows prior to cull reaches a maximum around the sixth parity. However, many sows are replaced before they can yield ideal reproductive efficiency, which causes a significant economic loss. To reach breakeven for a sow, it needs to produce at least three litters before being removed. In practice, approximately one-third of overall removals in gilts are due to reproductive failure, where conception failure and lack of observed estrus are the significant reasons. Apart from the high replacement rate, one of the key performance indicators for a sow's reproductive efficiency is the non-productive day, which is highly associated with the replacement rate and farrowing rate. Suppose a herd had an average of thirty-five non-productive days annually; the economic loss from each non-productive day was estimated to be $2.25 per sow. Lower non-productive day means higher litters per sow per year (LSY). At $2.25 per non-productive day and $22.00 per piglet, a 2,400-sow farmer may save $59,400 and also earn additional revenue of $52,800 from producing more litters per sow per year if the average non-productive day is reduced by eleven days.

The majority of modern swine farms have transferred from a natural mating system using boars to an artificial insemination method, where sexually mature pigs (sows or gilts) are kept in gestation stalls or small group pens for breeding manually (artificial insemination). The reproductivity performance of sows and gilts is a critical factor affecting the swine industry's production. Some of the key performance indicators (KPIs) in a sow farm can be improved. For example, sows have the potential to farrow 2.6 times/year and to produce 52 pigs weaned/mated sow/year (PW/MF/Y); however, the actual average PW/MF/Y was about half of that from 26.34, 26.14, and 26.61 in the year 2017-2019, according to the results of production analysis for the U.S. pork industry published by the National Pork Board. Other KPIs, including Farrowing Rate (defined as the proportion of females served that farrow) (~85%), annual replacement rate (46.5%), and piglet survival rate (~80%), are potential to be increased through better management.

Potential factors contributing to low reproductivity performance include failure of estrus detection, long Non-productive days (NPD), lameness, and health issues due to insufficient care or lack of effective tools. For example, failure to detect estrus accurately has the greatest impact on farrowing rate and litter size in an artificial insemination system. Sows typically show estrus for 48-72 hours, and ovulation occurs ⅔-¾ of the way through that period. Unfortunately, the duration of estrus is not known for a sow until after the sow is no longer in estrus, which is too late to determine the optimal time for artificial insemination. In current breeding programs, technicians inspect the herd once or twice a day to detect estrus, which is extremely time and labor-consuming and may miss the detection of accurate estrus for many herds. It is also quite common to conduct more than one artificial insemination to improve the pregnancy rate. In addition, failure to detect estrus and lameness are two major factors causing high annual replacement rates.

In practice, an ultrasound pregnancy test is used to confirm the pregnancy for sows four to five weeks after artificial insemination. If a sow fails to conceive from previous artificial insemination, farmers will often cull the sow to avoid more NPD. The economic loss from each NPD varies between $1.6 to $2.6 per sow. If the average NPD is reduced by 11 days for 2,400 sows in a typical farm, at $2 a non-productive day and $22 per piglet, this could save farmers $52,800 in cost and earn additional revenue of $52,800 from producing more litters per sow per year.

The conventional method for checking estrus (standing heat) is the Back Pressure Test (BPT, see FIG. 2), performed by skilled farmworkers who observe the sow's response when pressure is applied to the sow's back and side. To determine the estrus status of a sow, workers may ride on the sows to have sufficient pressure and take plenty of time to interact with the sows. Additional estrus signs, such as vulva conditions (swelling, redness, or mucous discharge), and boars are also used to improve the estrus detection accuracy. However, it is incredibly challenging to identify the estrus and determine the optimum time for artificial insemination for each sow due to the lack of skilled workers, large animal-staff ratio, and a large variation between sows. In practice, an estrus check is conducted multiple times a day for several days, and sows are fertilized more than once to achieve a better pregnancy rate, which leads to an increased cost for labor and semen. Approximately thirty percent of overall labor consumption in a sow farm is estimated to be used for estrus checks to determine the right time for artificial insemination. According to USDA-NASS, the number of breeding herds (sow and gilt) was 6.23 million in June 2021, which may result in more than 15 million times of estrus checks each year (assuming 2.5 times per sow per year). Therefore, there is significant economic value in improving estrus detection accuracy by using emerging technology.

Almost all estrus checks on US swine farms are performed manually. In the past decades, different estrus detection technologies have been researched. For example, an infrared proximity sensor was used to monitor sows' movement to estimate their estrus status, but the accuracy was not reliable. Another study used an RFID to monitor the visit times of a sow to the feeding station, which was used as an indicator of their activity level and estrus condition. However, this method could not provide better accuracy than seventy-five percent. Recent technologies, including wearable sensors and computer vision, have been used to detect sow estrus. Wearable sensors consisting of accelerometers, gyroscopes, and thermometers are attached to the ears or legs of animals to continuously monitor their activities and body temperature. Time-series data were analyzed using machine learning models to quantify the estrus. Although wearable sensors have been used in cattle, they have not been used in swine production due to aggressive behaviors and the typically large number of animals. A preliminary study with wearable sensors also showed the challenges involving the battery, installation, and damage of sensors.

The average farrowing rate in the United States was 82.06±9.952% in 2021, which can be improved through accurate estrus detection and mating frequency. Sow estrus is usually checked once or twice a day, accounting for approximately 30% of overall labor consumption in a sow farm. Although estrus detection accuracy may be improved by checking sows more frequently, it could be difficult due to labor availability and cost. Due to animal well-being concerns, more farmers are transitioning from individual stall housing to group housing conditions, making estrus detection much more challenging and labor-intensive. Therefore, there is a pressing need to develop new technologies for automated heat detection for individual sows under group-housed conditions.

Temperatures of the sow's body, vulva, and ear can be measured automatically using thermometers or infrared thermography, which have been used as potential tools for estrus detection. Research has shown that the inner vaginal temperature of gilts is reduced by 0.26° C. on the day of estrus compared to the three days prior to the estrus. Another study used infrared thermography to capture vulva surface temperature and found that vulva surface temperature peaks one to two days prior to estrus. Similarly, other researchers reported that the temperature difference between the vulva surface and udder (upper part of the anterior of the two mammary glands) reached the maximum (0.5° C.) on the day of estrus.

The interaction between the sow and boar is currently the most reliable method for estrus detection, which shows a sensitivity of more than 90%. The interaction can be described by the change in frequency and duration of a sow visiting a boar, and the duration of ear perks when interacting with a boar or a bionic boar which mimics the sounds, smells, and touch of a boar. A study established an estrus detection model using the duration and frequency of a sow's daily visit to a boar and reported an accuracy of 87.4% and a false alarm rate of 91%. Furthermore, it was reported that using a time threshold of duration that the sow shows perked ear during the visit of a boar can be a good indicator for estrus detection with a sensitivity of 79.16%.

Vulva swelling and reddening are signs of approaching estrus and are often checked along with BPT to detect estrus. During the period between weaning and ovulation, this change in the vulva region is due to the increase in circulating estrogens which stimulate blood flow in genital organs. In previous studies, vulva swelling, and vulva size were mainly evaluated based on visual observation or manual measurement of vulva width and length. However, visual observation can be subjective, and vulva width and length might not be able to accurately describe the difference in vulva size due to relatively small changes.

Therefore, there is a significant need for an apparatus to detect efficient sow estrus to support optimal reproductive management decisions that are preferably performed with a non-contact tool.

The background description provided herein gives context for the present disclosure. Work of the presently named inventors, as well as aspects of the description that may not otherwise qualify as prior art at the time of filing, are neither expressly nor impliedly admitted as prior art.

SUMMARY OF THE INVENTION

The following objects, features, advantages, aspects, and/or embodiments, are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a feature of the present invention to have a system for detecting sow physical change around estrus that includes a control unit including at least one processor and at least one memory, at least one three-dimensional measurement device, and a motorized movable mechanism attached to the at least one three-dimensional measurement device, wherein the control unit directs the motorized movable mechanism to obtain physical aspects of a sow on a periodic basis with images from the at least one three-dimensional measurement device.

It is a feature of the present invention that the physical aspects of the sow can include sow vulva volume and abdomen movement that is converted to a respiratory rate.

It is a feature of the system of the present invention that the at least one three-dimensional measurement device. An illustrative, but nonlimiting, examples of a three-dimensional measurement device include, but are not limited to, a 3D camera as well as a Light Detection and Ranging (LiDAR) camera with an RGB camera and a depth camera.

Still another feature of the present invention is a motorized movable mechanism that includes at least one motor electrically connected to at least one driver in electronic communication with the control unit.

It is another feature of the system of the present invention that a control unit includes a wireless module for transmitting sow vulva volume data for analysis.

It is an aspect of the system of the present invention that the motorized movable mechanism moves between a plurality of sow stalls to measure sow vulva volume for a plurality of sows located within the plurality of sow stalls with the at least one three-dimensional measurement device.

It is another aspect of the system of the present invention that the motorized movable mechanism includes a motorized trolley mounted within an overhead rail track and a retractable arm attached to the movable motorized trolley, and the at least one three-dimensional measurement device.

It is still another feature of the system of the present invention that the control unit initializes at least one three-dimensional measurement device, moves the motorized movable mechanism to take images of sow vulva volume, and then transmits sow vulva data for analysis.

An additional feature of the present invention is an overhead rail track in a loop.

It is still another feature of the system of the present invention that at least one three-dimensional measurement device provides posture recognition information to the control unit to determine if a sow is in a standing position.

Yet another aspect of the system of the present invention is that after the determination of the sow being in a standing position, the control unit electrically accesses a deep learning model to ascertain the physical condition of the at least one sow.

Another aspect of the system of the present invention is that if the sow is identified as in a sleeping state, the present invention will access a deep learning model to evaluate the respiratory rate of the animal.

Still, yet another feature of the system of the present invention is that the control unit electrically accesses a deep learning model to ascertain the physical condition of the at least one sow, the control unit electrically accesses a deep learning model to ascertain a vulvar condition of the at least one sow.

Another object of the system of the present invention is that after the control unit electrically accesses a deep learning model to ascertain the physical condition and a deep learning model to ascertain the vulvar condition of the at least one sow, existing data, and historical records are combined with the physical condition and the vulvar condition to provide a treatment recommendation of the at least one sow.

Another feature of the system of the present invention is that once the system of the present invention determines a sow is in estrus, then the treatment of the sow can commence by the farmer, which potentially includes artificial insemination.

Still another aspect of the system of the present invention is that the physical condition, the vulvar condition, the existing data, and historical records of the at least one sow are electronically transmitted to an electronic display and/or a webpage.

It is yet a further aspect of the system of the present invention that the physical condition and the vulvar condition within a predetermined time period of one to two days is concatenated with the categorical data, which includes at least one of time from weaning, parity number, body condition score (BCS) and sow breed to generate an output based on at least one activation function to determine if estrus is taking place for the at least one sow utilizing a deep learning model.

A further aspect of the present invention is a control unit including at least one processor and at least one memory, at least one three-dimensional measurement device, a motorized movable mechanism attached to the at least one three-dimensional measurement device, wherein the control unit directs the motorized movable mechanism to obtain physical aspects of a sow on a periodic basis with images from the at least one three-dimensional measurement device, wherein the at least one three-dimensional measurement device provides posture recognition information to the control unit to determine if a sow is in a standing position, which is followed by the control unit filtering standing images of sows to find images that provide a full view of a sow's vulva, which is then followed by the control unit electrically accessing a deep learning model control to identify and segment at least one image of the sow vulva region and generate a vulva volume value that is utilized to determine if a sow is in estrus.

An additional aspect of the present invention is a control system that verifies the shape of the sow vulva in the identified and segmented image to verify that the image can be utilized to determine if the sow is in estrus.

It is another objective of the present invention to have a method for detecting sow vulva change around estrus that includes obtaining measurements of sow vulva volume periodically with images from at least one three-dimensional measurement device that is attached to a motorized movable mechanism that is commanded by a control unit having at least one processor and at least one memory.

It is a feature of the method of the present invention that the at least one three-dimensional measurement device. An illustrative, but nonlimiting, examples of three-dimensional measurement devices include, but are not limited to, a 3D camera as well as a Light Detection and Ranging (LiDAR) camera having an RGB camera and a depth camera.

Still another aspect of the method of the present invention is that the motorized movable mechanism includes a motorized trolley mounted within an overhead rail track and a retractable arm attached to the movable motorized trolley and the at least one three-dimensional measurement device, wherein the control unit initializes the at least one three-dimensional measurement device, moves the motorized movable mechanism to take images of sow vulva volume, and then transmits sow vulva data for analysis.

Yet another object of the method of the present invention is the step of electronically accessing a deep learning model to ascertain the physical condition of at least one sow and electronically accessing a deep learning model to ascertain the vulvar condition of the at least one sow.

Still, another feature of the method of the present invention is the step of taking the physical condition and the vulvar condition of the at least one sow that is concatenated with categorical data including at least one of time from weaning, parity number, BCS, and sow breed to generate an output based on at least one activation function to determine if estrus is taking place for the at least one sow utilizing a deep learning (machine learning/neural network) model. Moreover, it is believed with the present invention that even simple machine learning, e.g., decision trees, can provide good accuracy with the activity and vulva size data extracted with this approach of the present invention.

An additional aspect of the present invention is a method for obtaining wherein the at least one three-dimensional measurement device provides posture recognition information to the control unit to determine if a sow is in a standing position, which is followed by the control unit filtering standing images of sows to find images that provide a full view of a sow's vulva, which is then followed by the control unit electrically accessing a deep learning model control to identify and segment at least one image of the sow vulva region and generate a vulva volume value that is utilized to determine if a sow is in estrus.

Methods can be practiced which facilitate the use, manufacture, assembly, maintenance, and repair of the above apparatus, which accomplish some or all of the previously stated objectives.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

An artisan of ordinary skill in the art need not view, within the isolated figure(s), the near-infinite number of distinct permutations of features described in the following detailed description to facilitate an understanding of the present invention.

DETAILED DESCRIPTION

The present disclosure is not to be limited to that described herein. Mechanical, electrical, chemical, procedural, and/or other changes can be made without departing from the spirit and scope of the present invention. No features shown or described are essential to permit the basic operation of the present invention unless otherwise indicated.

Figure 3:
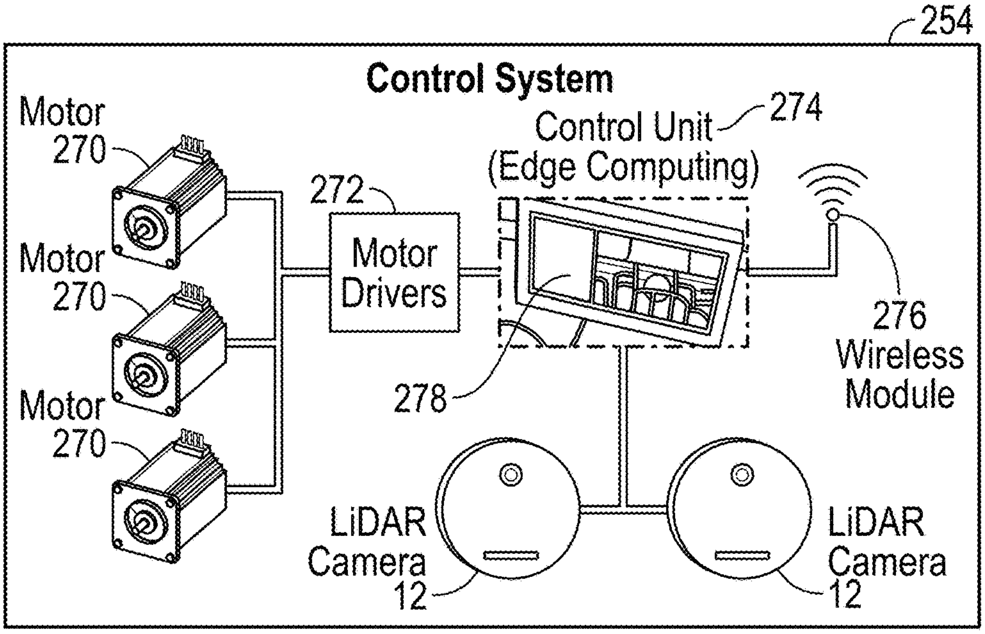
FIG. 3 is a schematic of a control system for the robotic imaging system of the present invention, including motors, motor drivers, a control unit with wireless communication, and three-dimensional image cameras.

Referring again to the Figures, a three-dimensional measurement device is generally indicated by the numeral 12 in FIG. 3. An illustrative, but non-limiting, example of a three-dimensional measuring device is a Light Detection and Ranging (LIDAR) camera (which includes an RGB camera and a depth camera). The depth camera calculates the distance from the sensor to an object's surface based on the time-of-flight method, i.e., the delay between laser beam emission and reception of the reflected beam. The LiDAR camera is more accurate than those based on stereo vision. An illustrative, but non-limiting, example of a LIDAR camera is an Intel® RealSense™ LIDAR Camera L515 manufactured by the Intel Corporation, having a place of business at 2200 Mission College Blvd., Santa Clara, California 95054.

The LiDAR camera is more accurate than those based on stereo vision, e.g., Intel® RealSense™ D415 camera. The depth aspect of the Intel® RealSense™ LIDAR Camera L515 has a field view of 70°×55° and a depth resolution of 640×480 pixels with a measurement accuracy of less than five millimeters when an object is placed around one meter away from the sensor at indoor conditions. The RGB aspect of the Intel® RealSense™ LIDAR Camera L515 has a resolution set as 1280×720 pixels, and images were aligned with the LiDAR images. The Intel® RealSense™ LIDAR Camera L515 was connected to a laptop (not shown). A wide variety of laptops may suffice, with an illustrative, but non-limiting, example being a DELL® LATTITUDE® 5480 laptop manufactured by Dell, Inc. having a place of business at One Dell Way Round Rock, Texas 78682 and controlled via an electrical cable, e.g., USB 3.0, and firmware, e.g., Intel® RealSense™ Viewer SDK 2.0, manufactured by the Intel Corporation, having a place of business at 2200 Mission College Blvd., Santa Clara, California 95054.

Before using the three-dimensional measurement device 12, e.g., LiDAR camera, on sows, the three-dimensional measurement device 12 for accuracy is set up through a default setup program.

The three-dimensional measurement device 12, e.g., LiDAR camera, images of the sows' vulva regions were preferably collected at a regular time period every day. Because the vulva might become swollen immediately after artificial insemination, imagery data were collected at least five hours after completion of the artificial insemination. While the sows were standing, the three-dimensional measurement device 12, e.g., LiDAR camera, was pointed horizontally at the hip of the sows from a distance between 0.7 meters-1.0 meters to acquire imagery data. The three-dimensional measurement device 12, e.g., LiDAR camera, took both RGB and depth image frames at a rate of thirty frames per second for about two minutes for each sow.

Python script was built to access the recorded data and save each frame as a point cloud object using the Intel® RealSense™ Python package. Five point-cloud data were randomly selected from the three-dimensional measurement device 12, e.g., LIDAR camera, recordings for each sow of each day for further processing to evaluate the sows' vulva size (swelling).

Figure 4:
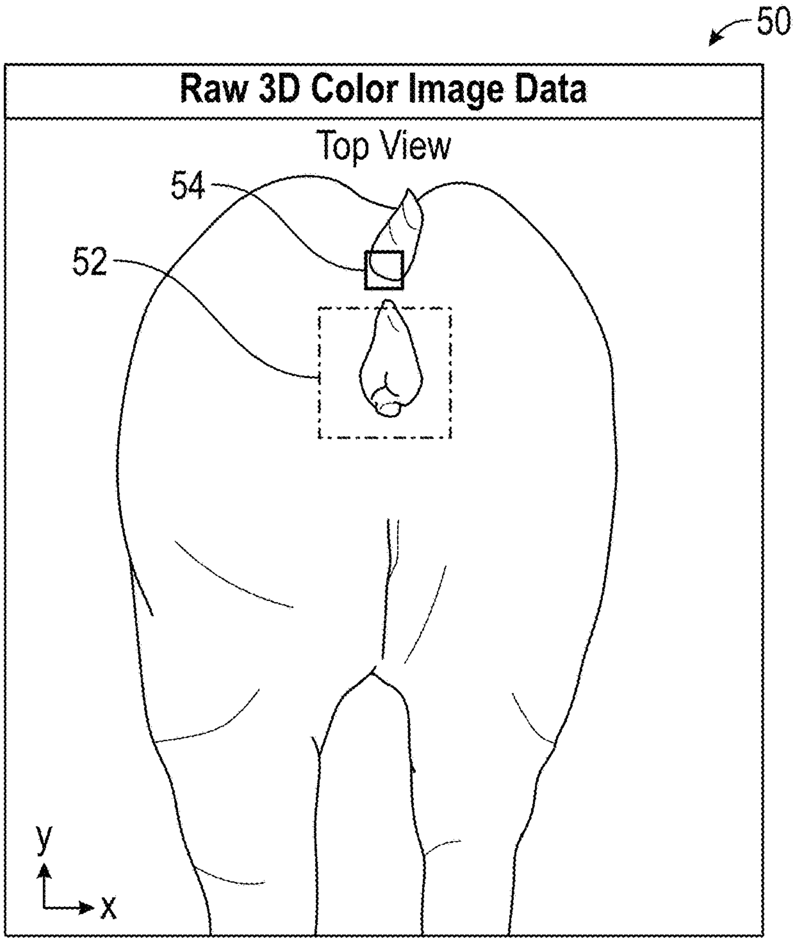
FIG. 4 shows a raw three-dimensional image data top view of both the rectal region and rectangular vulva region of a sow.

An open-source software CloudCompare (Version 2.11.1) was used to manually segment the three-dimensional (3D) point cloud of all sows into rectangular regions that contained the sows' vulva region in the center as shown in FIG. 4, as generally indicated by numeral 50 that includes a rectal region 54 and a rectangular vulva region 52.

Figure 5:
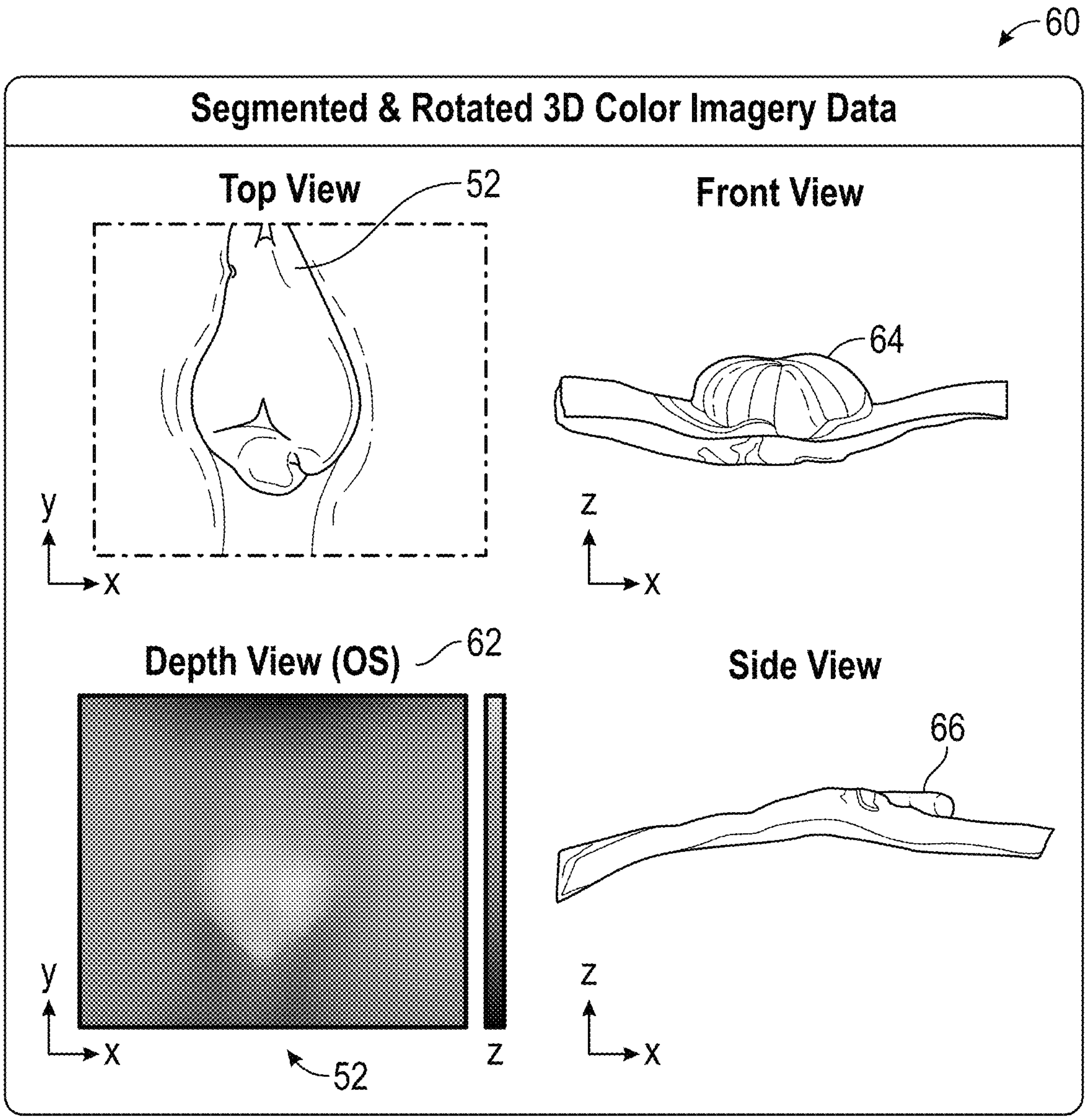
FIG. 5 shows a segmented and rotated three-dimensional color image data view of the rectangular vulva region of a sow from both a top, front, side, and depth views.

Referring now to FIG. 5, the raw three-dimensional view of the sows' vulva region 52 from FIG. 4 is shown as a segmented and rotated three-dimensional view 60. This includes a segmented top view 52, a front view 64, a top view 66, and a depth view 62. The depth view 62 of Original Surface (OS) is a 3×300×300 matrix that contains the spatial information of the region of interest in the XYZ domain.

Figure 6:
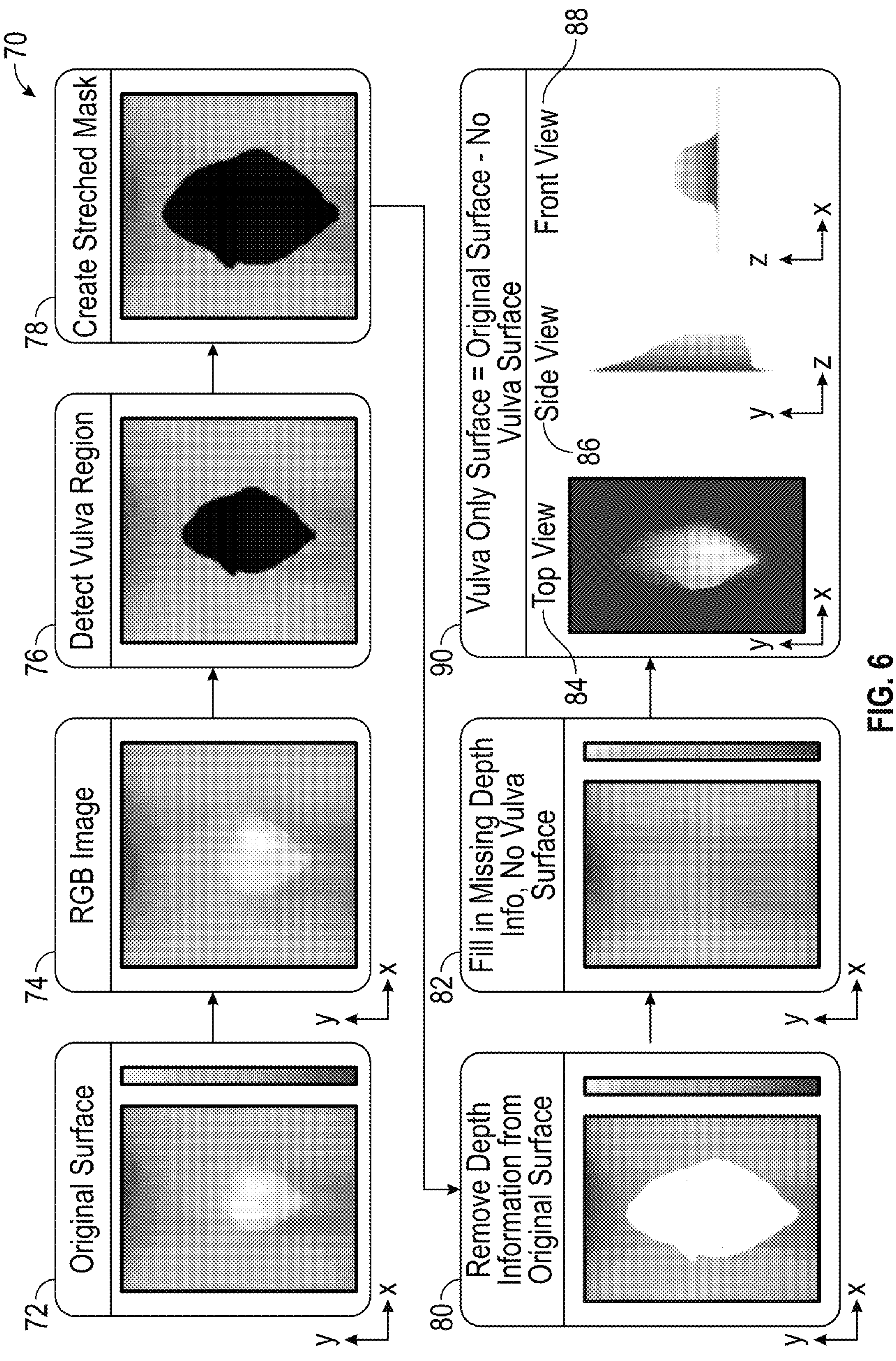
FIG. 6 shows a sequence of images demonstrating the process of segmenting the vulva region of a sow.

Referring to FIG. 6, a script was developed to automatically process each "Original Surface" using a MATLAB® program. FIG. 6 demonstrates the process of segmenting the three-dimensional (3D) surface of the vulva region (removing background) as generally indicated by the numeral 70. First, the original surface 72 was converted into a color image of 300×300 pixels 74 by converting depth information to RGB values. The vulva region 76 was identified by finding the largest round region from the color image using the region props function of MATLAB®. Next, to ensure the entire vulva region was covered, a mask 78 was created by scaling the identified vulva region by thirty-five percent using an imdilate function of MATLAB®. To acquire the depth information of the background (without the vulva), the depth information in the masked region 80 was replaced with new values by interpolating the nearby depth information. A three-dimensional shape marked as "No Vulva Surface" 82 was generated to represent a surface as if the vulva did not exist. Last, the "Vulva Only Surface" 90 was acquired by subtracting the "No Vulva Surface" from the original surface 72. "Vulva Only Surface" 90 illustrates the shape of a vulva in three views, including a top view 84, a side view 86, and a front view 88.

The height of the vulva region was determined based on the maximum height found in the "Vulva Only Surface" 90. After fitting an ellipse shape to the vulva region, the vulva's width and length were determined based on the ellipse's major axis and minor axis length.

Figure 7:
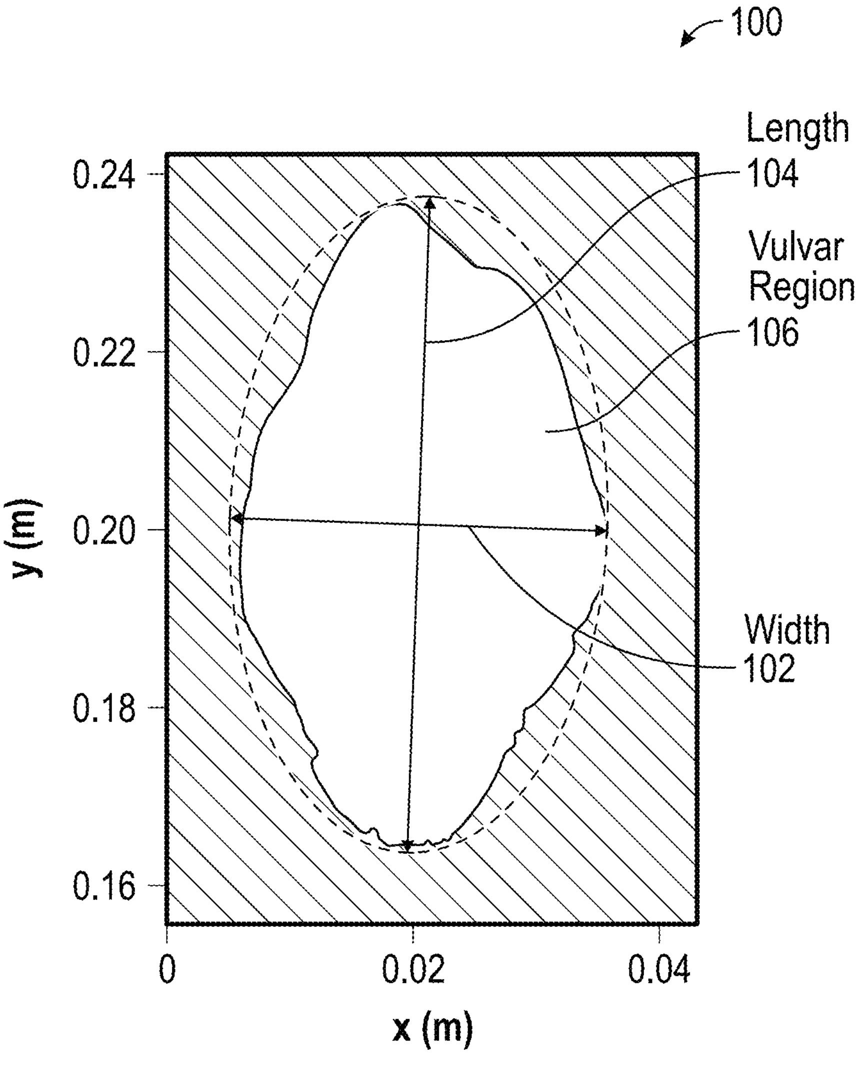
FIG. 7 illustrates vulva width, length, height, and base area definition.

Referring now to FIG. 7, generally indicated by the numeral 100, which illustrates a vulvar region 106 having a length of 104 and width of 102. Two-dimensional (2D) features and three-dimensional (3D) features were defined to describe vulva size changes around estrus. The two-dimensional (2D) features include surface area (SA), base area (BA), horizontal rectangular area (HRA, the product of width and length), and vertical rectangular area (VRA, product of width and height), as defined as following Equations 1 through 4 below:

$$SA = \iint \sqrt{\nabla f^2 + (\nabla f')^2 + 1}\, dxdy \quad \text{Equation 1}$$

$$BA = dxdy,\ f > 0 \quad \text{Equation 2}$$

$$HRA = \text{Width} \times \text{Length} \quad \text{Equation 3}$$

$$VRA = \text{Width} \times \text{Height} \quad \text{Equation 4}$$

where SA is the surface area that is the integration of depth (height) pixel on the 300×300 depth map (f), i.e., "Vulva Only Surface"; and dx dy is the projected area of each element in f. The base area (BA) is calculated as the total number of values in f that are greater than zero.

Three of the three-dimensional (3D) features, including volume (V) and cubic volume (CV) of a vulva, as well as the maximum percentage of increase in volume (PIV) observed in each sow, are defined in Equations 5-7 below and shown in FIG. 7:

$$V = \iint f dxdy \quad \text{Equation 5}$$

-continued $$CV = \text{Width} \times \text{Length} \times \text{Height} \quad \text{Equation 6}$$

$$PIV = [\text{Max}(V) - \text{Min}(V)]/\text{Min}(V) \quad \text{Equation 7}$$

As an illustrative, but nonlimiting, example, RStudio® Team (Version 1.2.5033) was used for all statistical analyses (R Version 3.6.2), where RStudio® has a place of business at 250 Northern Avenue, Boston, Massachusetts 02210. A two-way ANOVA test was conducted to examine the effect of distance and angle on the measurement accuracy of the three-dimensional measurement device 12, e.g., LiDAR camera. A correlation analysis was conducted to evaluate the correlation between all image features and vulva volume. It is expected that the vulva volume could be represented by the width, length, and height that are easy to measure. Linear and polynomial regression models were developed to describe the relationship between the calculated vulva volume and the two-dimensional (2D) and three-dimensional (3D) image features. The statistics of all vulva features, including daily means, were calculated. A student t-test (t.test) was conducted to determine the significance of the difference in vulva size (volume and HRA) on different days relative to the records from the previous three days. The significance level was set as 0.05. This technology is not restricted to vulva volume only but can also be applied to vulva volume, vulva width, vulval length, vulva height, vulva surface area, vulva base area, and vulva color to determine estrus.

Figure 8A:
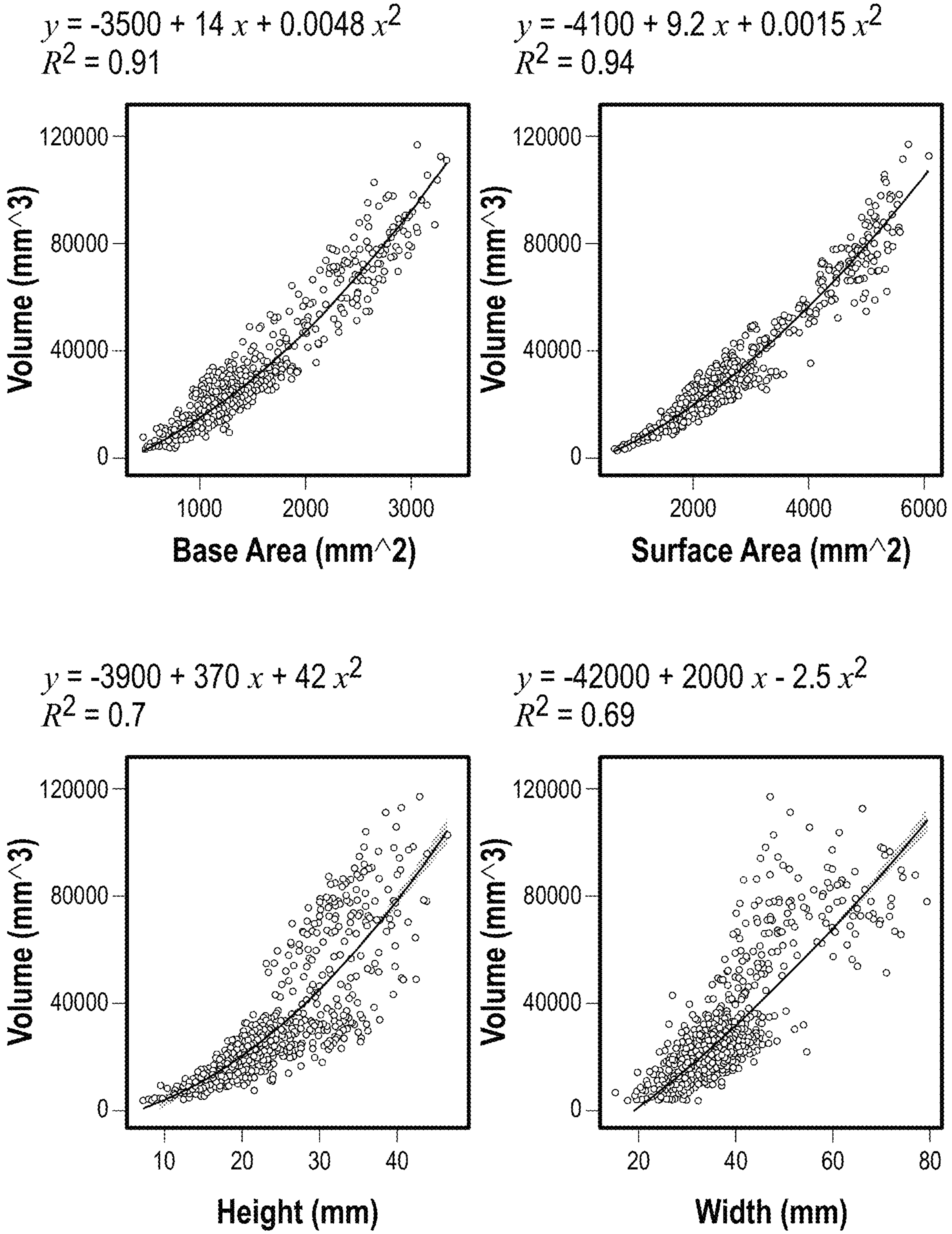
FIGS. 8A and 8B show regression analysis results that are two-dimensional and three-dimensional, providing the relationship between image features and calculated vulva volumes.
Figure 8B:
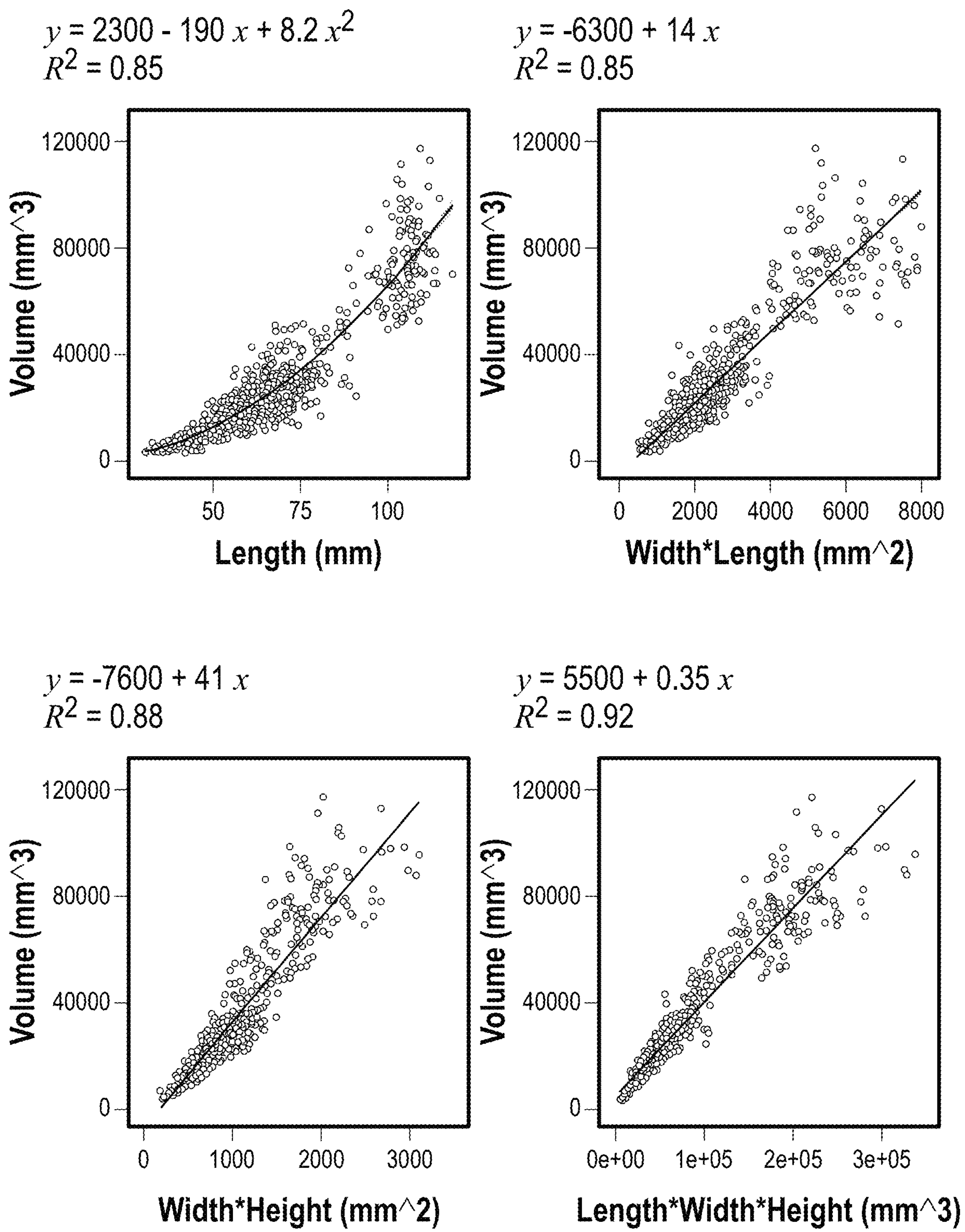

Regarding vulva size evaluation, there are a number of correlations among extracted image features. The regression analysis results among the two-dimensional (2D) and three-dimensional (3D) figures are shown in FIGS. 8A and 8B, which indicate width, length, and height alone, compared with other features, have a relatively small correlation with volume. Vulva length alone explained the same variance in vulva volume compared to the HRA. Vulva width, length, and height together can better distinguish vulva size compared to using base area or width and length only. Vulva surface area can better describe the difference in vulva volume ($r^2$=0.94) compared to other features. As expected, a strong correlation was observed among the two-dimensional (2D) and three-dimensional (3D) vulva imagery features ($r>0.85$).

Regarding the change in vulva size around the estrus, a farm technician identified all sows' estrus. Results indicate that all sows showed estrus within ten days (7.25±1.75 Days) after the last Matrix® feeding. Matrix® is a product of Merck & Co., Inc. having a place of business at 351 N. Sumneytown Pike, North Wales, Pennsylvania 19454.

The estrous period lasted three days for the gilt and two days for the sows. The detected estrus data were used to evaluate the performance of the three-dimensional measurement device 12, e.g., LiDAR, in detecting estrus.

The daily values of the two-dimensional (2D) features (SA, BA, HRA, VRA) and three-dimensional (3D) features (volume, CV) of each sow throughout the experiment are shown in FIGS. 9A through 9H and FIGS. 10A through 10H, respectively. Day 0 indicates the last day of feeding Matrix®. The center bars indicate the estrus intervals detected by the technician. It can be seen from FIGS. 9A through 9H that the variations of two-dimensional (2D) features could indicate the estrous status well, with the peaks shown around estrus. Since the two-dimensional (2D) features are highly correlated with each other, they showed similar patterns, as shown in FIGS. 9A through 9H, for the eight sows.

Figures 9A, 9B, 9C, 9D:
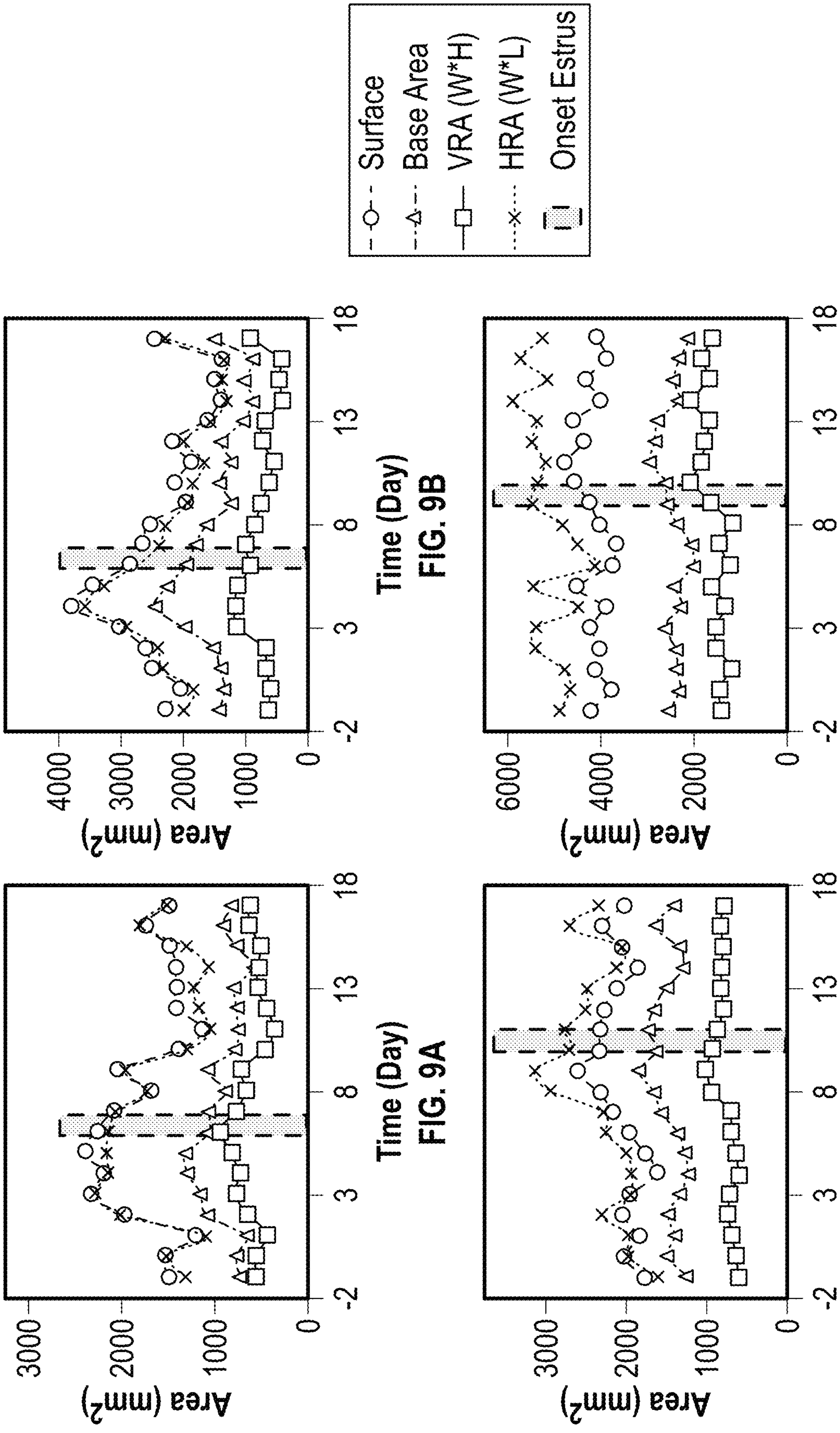
FIGS. 9A through 9H show a graphical analysis of two-dimensional vulva features around estrus for eight sows.
Figures 9E, 9F, 9G, 9H:
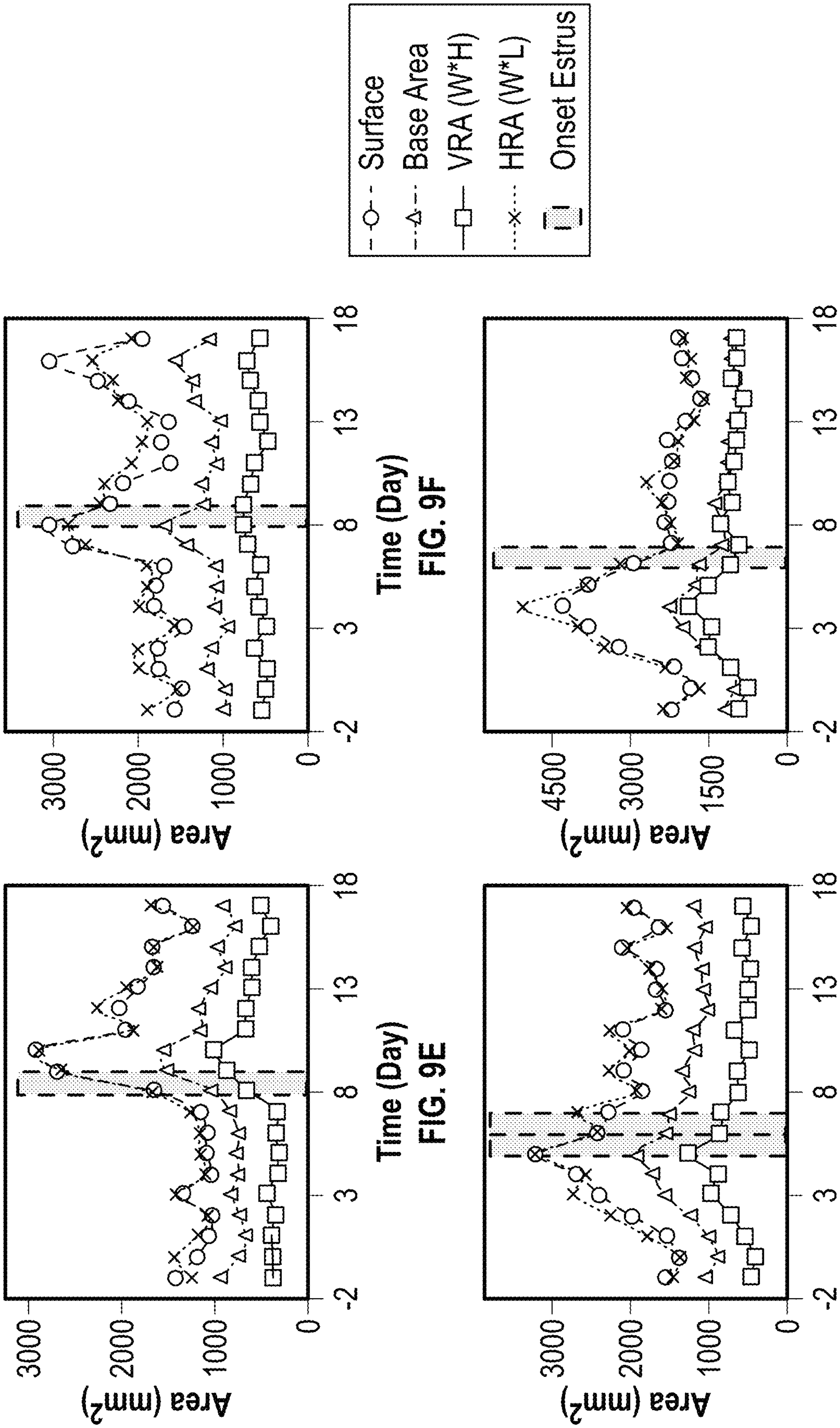
Figures 10A, 10B, 10C, 10D:
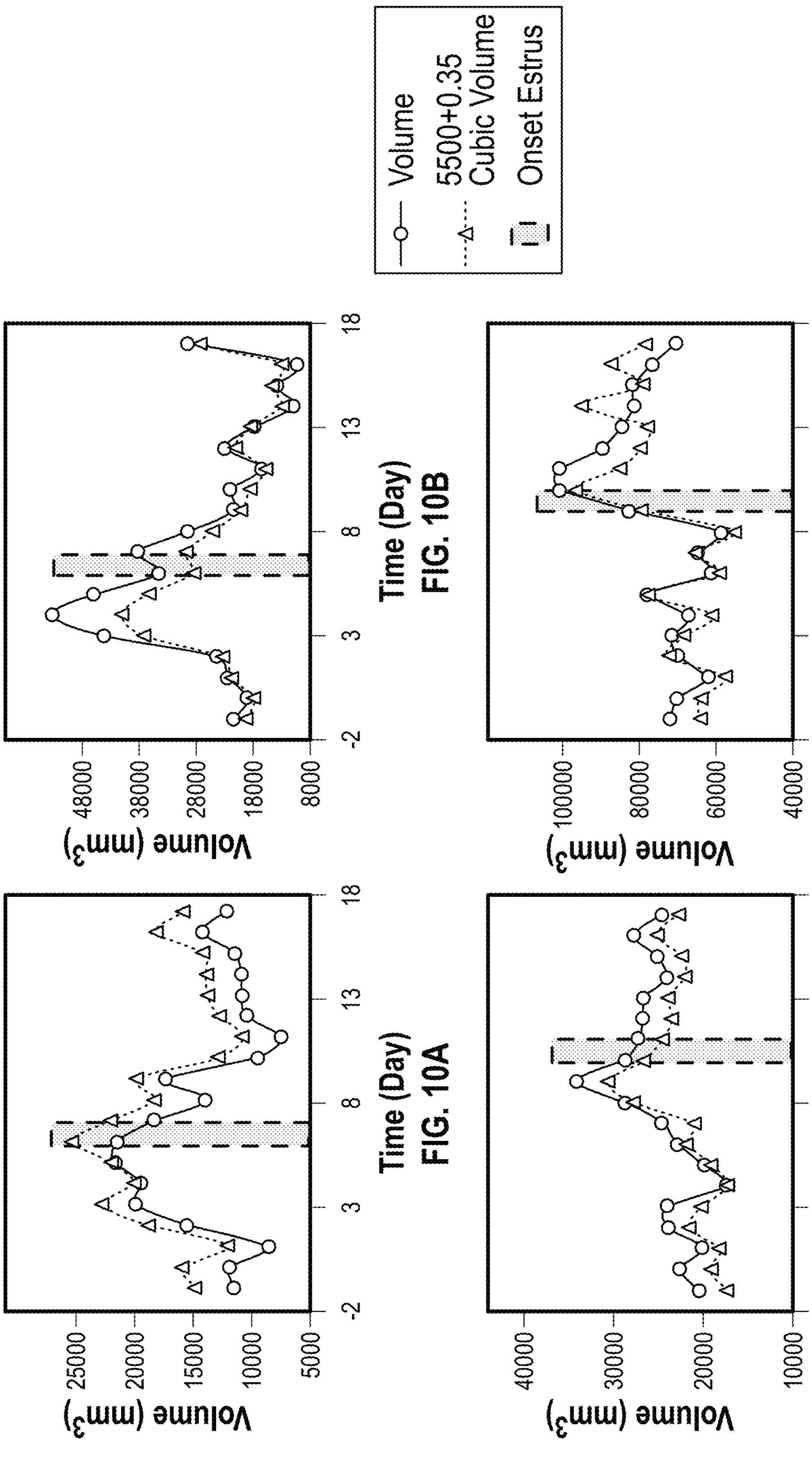
FIGS. 10A through 10H show a graphical analysis of three-dimensional vulva features around estrus for eight sows.
Figures 10E, 10F, 10G, 10H:
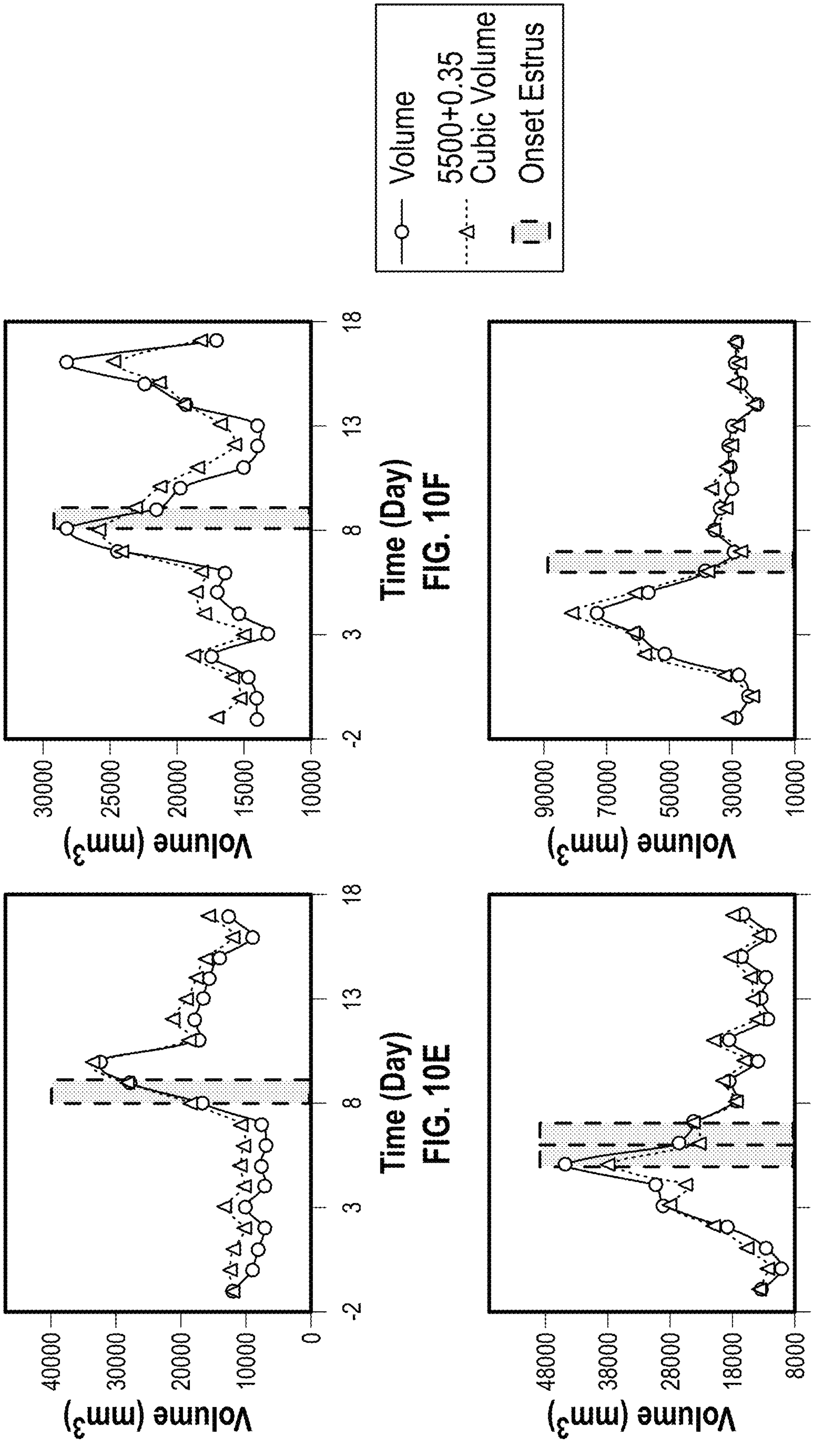
Figure 11:
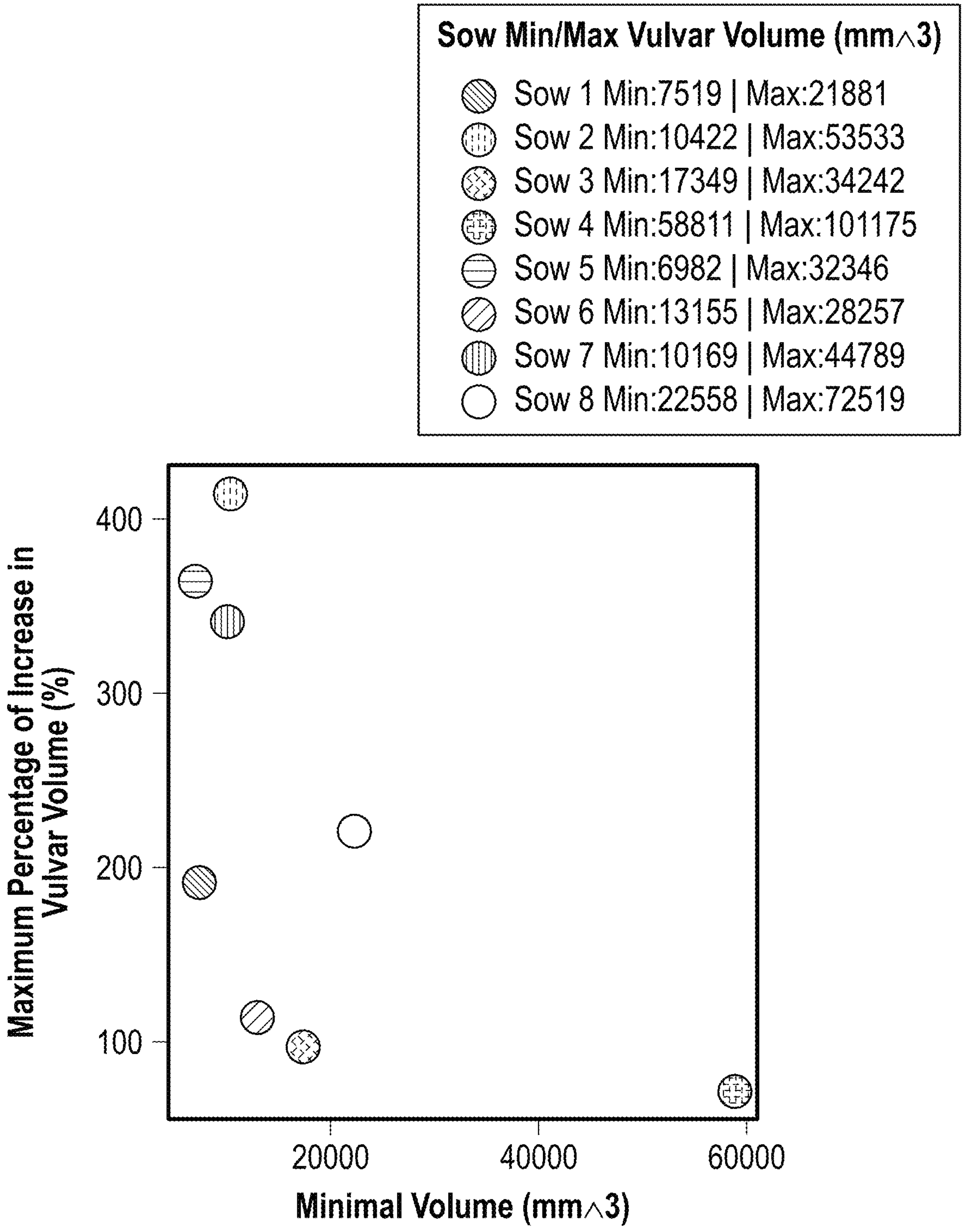
FIG. 11 shows a graphical analysis of minimum and maximum vulvar volume around estrus for eight sows for a period of two days.

Among the two-dimensional (2D) features, the vulva width and length are relatively easy for manual measurement. Therefore, the HRA was selected as a representative of the two-dimensional (2D) features, and its change around the estrus was evaluated. The results of the t-test indicate that there was a significant increase in HRA (p-value<0.01) within days prior to the estrus for all sows except Sow 4 (FIG. 9D). Based on visual examination of Sow 4's vulva region and the two-dimensional (2D) and three-dimensional (3D) features shown in FIGS. 9A-9H and 10A-10H, Sow 4 had a larger vulva size compared to the rest of the sows as shown in FIG. 11, the residual increases as HRA increase, suggesting that HRA is less descriptive for the higher volume vulva region. Therefore, for sows with larger vulva sizes, HRA might not capture a significant change in the vulva region around the estrus. In addition, Sow 6 showed another substantial increase in redness and swelling at five days after her estrus for an unknown reason, which could be seen in recorded daily features around Day 15, as shown in FIG. 9F.

To illustrate the vulva CV that represented the vulva volume, CV was linearly transformed with coefficients shown in FIGS. 8A and 8B. In FIGS. 10A-10H, both three-dimensional (3D) features (volume and linearly transformed CV) showed a noticeable increase prior to the onset of estrus for all sows (including Sow 4), indicating that the three-dimensional (3D) features were more reliable in detecting estrus than the two-dimensional (2D) features. FIGS. 10A-10H show that two sows (#4 and #5) came in heat one or two days before reaching the volume peaks, two sows (#6 and #7) came in heat on the day at the peaks, and four sows came in heat one or two days after reaching peaks of vulva volume. The significant difference in vulva volume was determined by comparing the recorded volumes on Day 1 with the records from the previous three days. Significant change (p-value<0.05) in vulva volume was found for all sows in the zero to one-day period prior to the onset of estrus.

The percentage of increase in volume between two days around the estrus was calculated for each sow. The relation between the maximum percentage increase and its minimum recorded vulva volume during the experiment is shown in FIG. 11. It can be seen that sows with a smaller vulva region had a higher percentage increase in vulva volume than those with a larger vulva size. This could be the reason that vulvar swollenness is less distinctive with visual evaluation for high parity sows that often have larger vulva sizes.

To evaluate vulva size automatically, an image processing pipeline based on deep learning neural network model (U-Net) has been developed to automatically identify the tail, anal, and segment vulva region from three-dimensional (3D) images. U-Net is a convolutional neural network that was developed for biomedical image segmentation at the Computer Science Department of the University of Freiburg. The network is based on the fully convolutional network, and its architecture was modified and extended to work with fewer training images and to yield more precise segmentation. Segmentation of a 512×512 image takes less than a second on a modern GPU. U-net is only one illustrative, but nonlimiting, example of deep learning tools that can be utilized with the present invention. Numerous other tools like VGG16, MobileNet, Xception, and DenseNet121 can be utilized. Based on the experimental analysis, there appears to be no significant difference in model performances when using different types of input images for posture recognition. However, results show that the VGG16 took significantly more time ($p<0.01$) than the other models tested to process each image and yielded significantly lower validation and test accuracy ($p<0.01$).

Meanwhile, the MobileNet took significantly less time ($p<0.01$) than the other models tested to process each image, and there was no significant difference in performance for recognizing standing and sitting postures to the rest of the models ($p>0.1$). Although the Xception model took more time ($p<0.01$) to process each image frame than MobileNet and DenseNet, it had significantly higher test accuracy and F1 scores for lateral lying and sternal lying postures ($p<0.05$). The overall performance of DenseNet was between MobileNet and Xception. Although DenseNet took more time to process each image compared to MobileNet, no significant improvement in test accuracy or F1 scores for different posture classes was observed. It appears that MobileNet should be used to monitor the sow's activity level at a high frame rate, i.e., video feed, and Xception should be selected when accurately distinguishing different lying postures (sternal and lateral). It seems that the results indicated that the image type has no significant impact on the posture recognition models' performance. Xception has the best accuracy but requires a longer processing time than MobileNet and DenseNet121. Using the posture recognition model to monitor an individual sow's behavior patterns after weaning, the result indicated a significant increase in daily activity and semi-idle level, and a significant decrease in daily idle level was found on the day of onset of estrus. No distinct behavior pattern was observed around the expected return estrus.

Figure 12:
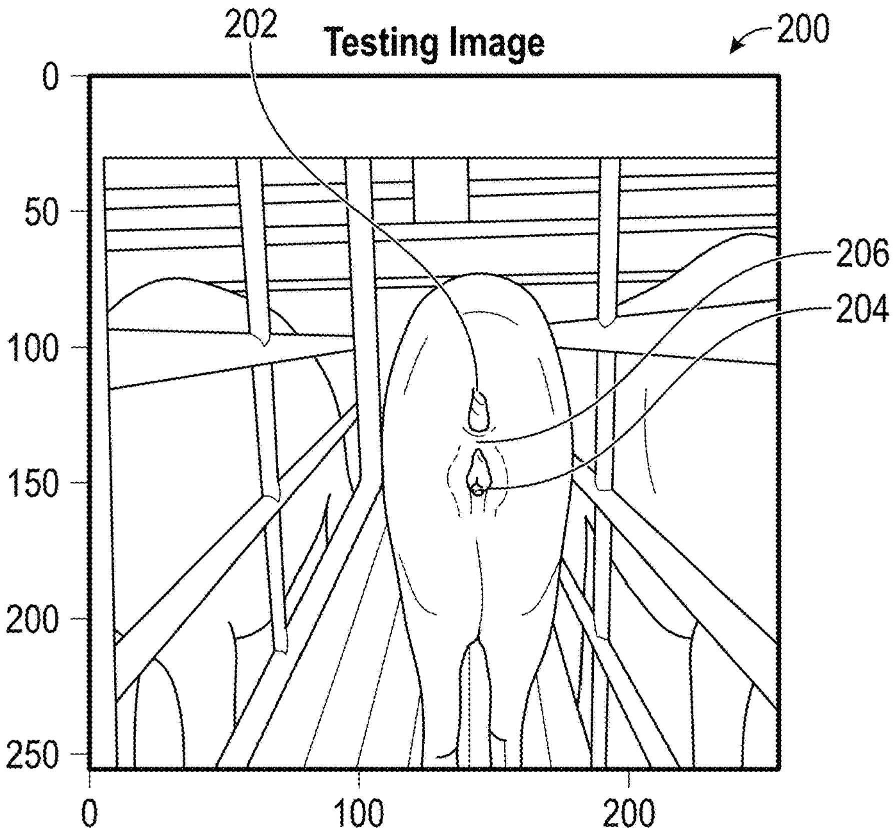
FIG. 12 shows an IR channel of a LIDAR camera testing image of a vulva, tail, and anal portion of a sow.

FIG. 12 shows one testing image frame 200 in the IR channel of the three-dimensional measurement device 12, e.g., LiDAR camera, with the sow tail 202, sow vulva 204, and sow anal 206 forming the original image frame.

Figure 13:
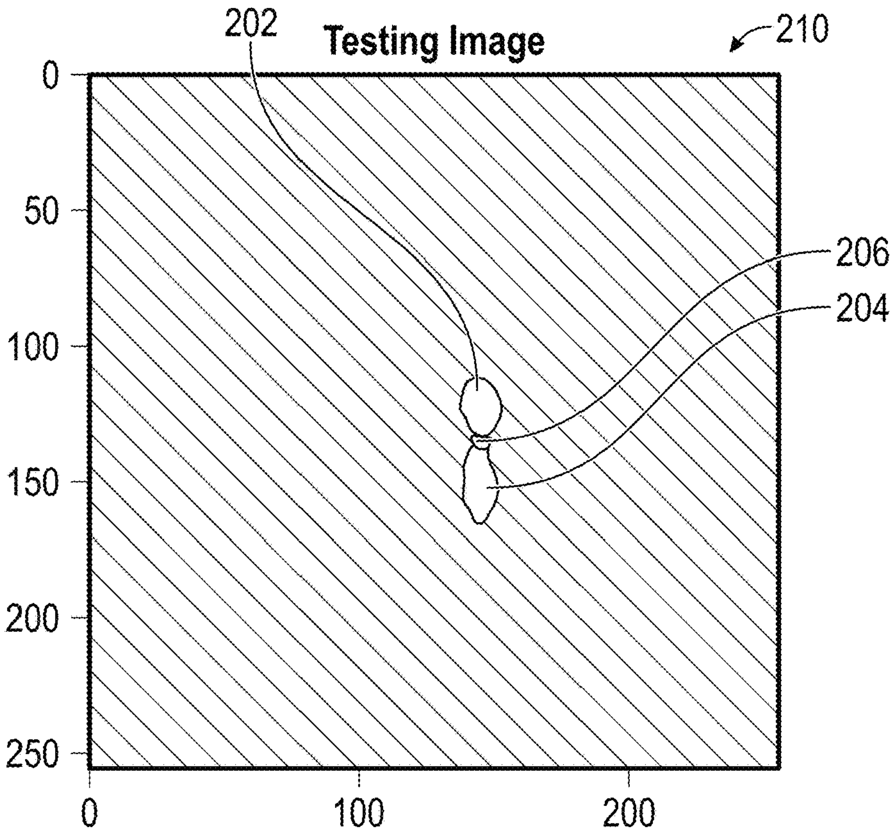
FIG. 13 shows a corresponding testing image based on the LIDAR camera image of a vulva, tail, and anal portion of a sow from FIG. 12.

Referring to FIG. 13, the predictive testing image is generally indicated by the numeral 210 with the sow tail 202, sow vulva 204, and sow anal 206. The preliminary results show that the U-Net deep learning model could accurately identify 98% of the sow vulva region 204 and 99% of the sow tails 202. The automated pipeline for vulva detection and segmentation will be implemented in an edge computing unit for real-time processing of images acquired by the robotic CPS system of the present invention.

Figure 14:
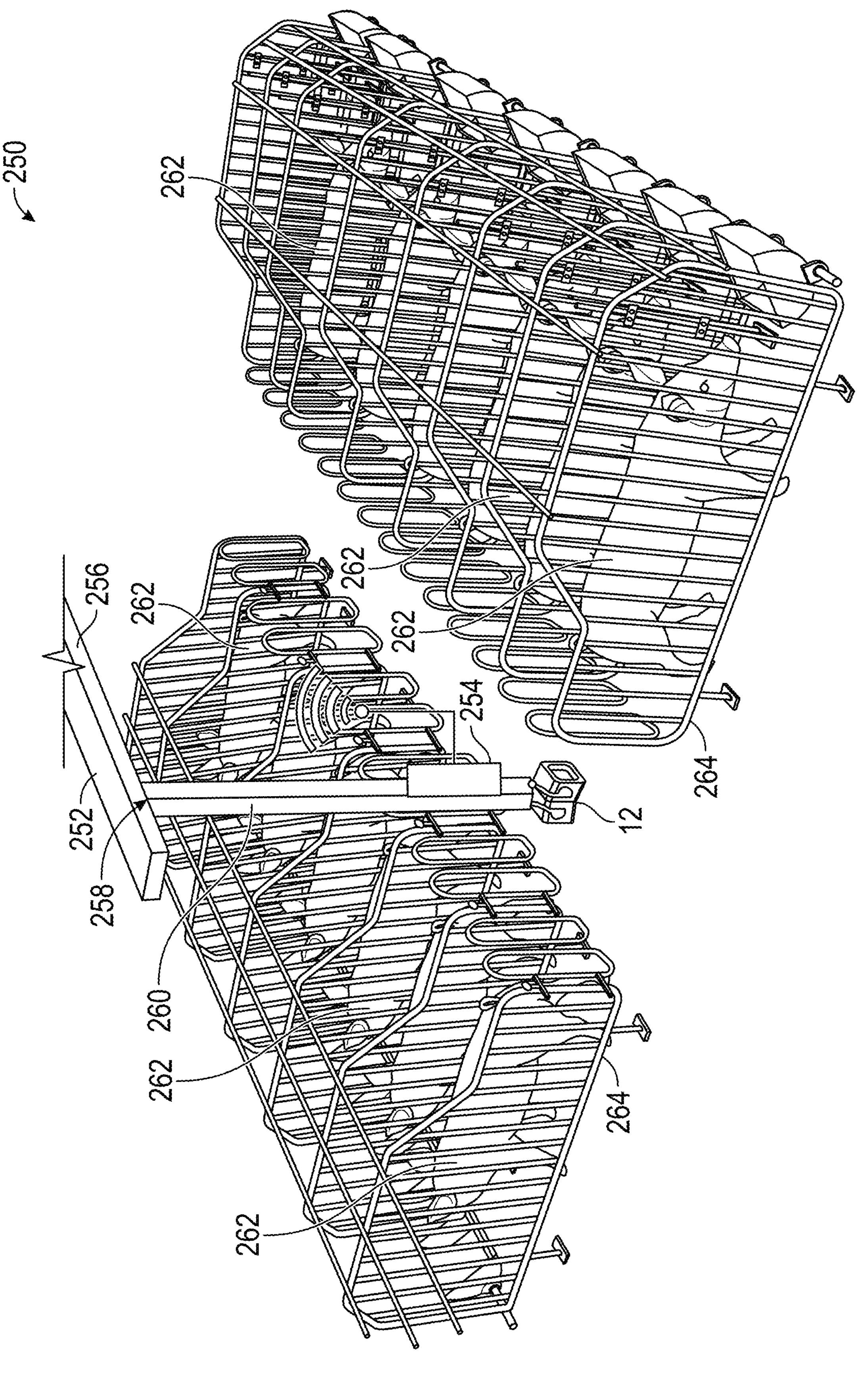
FIG. 14 is a perspective view of a robotic imaging system associated with the present invention, including an overhead rail track, motorized trolley, retractable arm, three-dimensional image cameras, a control system, and sow stalls for smaller farm operations.
Figure 15:
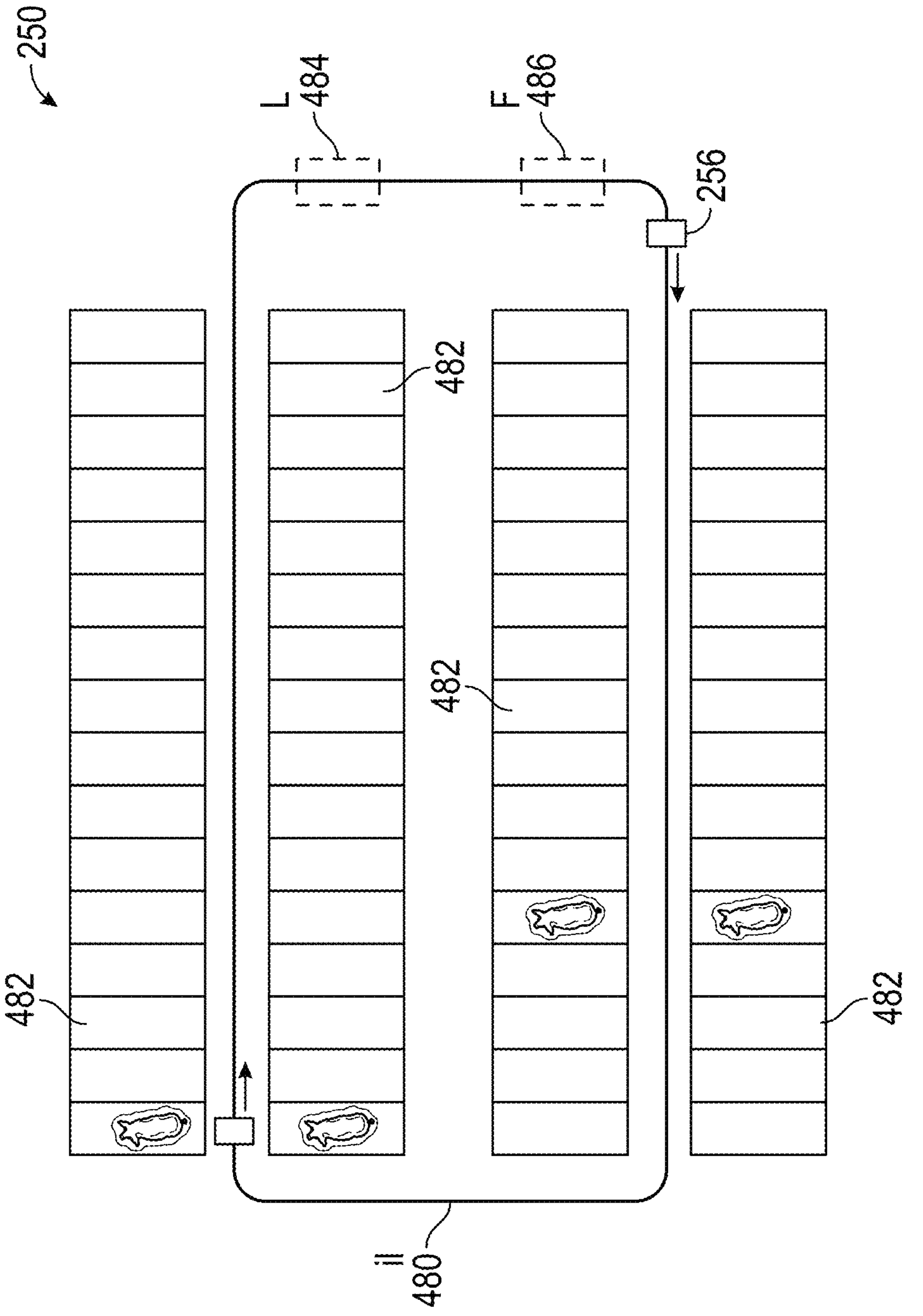
FIG. 15 is a schematic view of a robotic imaging system associated with the present invention that is preferred for larger farm operations, including a looped overhead rail track, a robot with a three-dimensional camera, and two docking stations with four illustrative rows of sow stalls.

The robotic camera system includes a platform controlled by a RASPBERRY PI® (where RASPBERRY PI® is a federally registered trademark of the Raspberry Pi Foundation private limited company of the United Kingdom located at 30 Station Road, Cambridge, United Kingdom CB12JH), an RGB and an infrared camera to collect rear-view images of individually housed sows during a predetermined time period, e.g., every ten minutes, as shown in FIGS. 3, 14, and 15. The collected imagery data (RGB images and thermal images) were analyzed using a convolutional neural network (CNN) model to successfully classify the posture of sows into Standing, Sitting, and Lying (100%). The activity patterns were used to evaluate the body condition score. The preliminary results show that the activity pattern could distinguish sow with different body condition scores (BCSs). The robotic platform preferably integrates more than one three-dimensional (3D) measurement device 12, e.g., LiDAR cameras or similar depth cameras, edge-computing units, retractable arms, IoT systems, and AI-enabled decision-making systems.

This low-cost robotic cyber-physical system ("CPS") includes a physical system consisting of a robotic imaging system to acquire images of individual sows that will be processed and analyzed by a cyber system based on edge/cloud computing for decision making. The proposed robotic CPS system can be potentially integrated with on-farm automation systems, such as electrical sow feeders ("ESF"), to automatically adjust feed quota for individual sows. The robotic CPS system aims to optimize sow breeding management with or without needing human input. The CPS system will provide real-time data acquisition, analysis, and decision-making for sow estrus, an optimum time window for artificial insemination, feed quota for each sow, activity pattern, and body structure.

This system can include a robotic imaging system, edge computing devices, AI-enabled data processing, and analytic pipelines, and a cloud-based control and management system. The system will preferably utilize core CPS technologies, including emerging sensors, IoT, edge/cloud computing, and control, to monitor sow estrus by automatically assessing multiple estrus signs, activity level, and body conditions.

A robotic imaging system of the present invention is generally indicated by the numeral 250 in FIG. 15, preferably includes a robotic platform 252, at least one three-dimensional measurement device 12, e.g., LiDAR camera, (preferably two), a control unit 254 that preferably includes edge computing and IoT with wireless communication. As shown in FIG. 14, an overhead rail track (or a gantry crane) 256 can be used to support a motor-driven trolley 258 that attaches a retractable arm 260 to adjust the height of the at least one three-dimensional measurement device 12, e.g., LiDAR cameras, that analyzes the back of the sows 262 located in the sow stalls 264. This setup works primarily with a smaller farm, e.g., dual rows of sows 282. Although this motor-driven trolley 258 is preferred, numerous other 3D cameras, like those found on smartphones among numerous other comparable devices, can generate images and utilize the pipeline of this present invention.

Referring now to FIG. 15, the optimal layout for larger farming operations is to have an overhead circular loop for the overhead track rail 480. This provides more accurate data that is received more consistently. There are a series of rows of pig gestation stalls, e.g., four rows, 482. There are docking stations 484 and 486 for the robot or motor-driven trolleys 258 having a three-dimensional measurement device 12.

As shown in FIGS. 3, 14, and 15, all motors 270 in the motorized trolley 258 will be controlled by the control unit 254 through motor control drivers 272 that is preferably, but not necessarily, utilizing an edge computing unit 274 such as, but not limited to, a NVIDIA® Jetson™ TX2 series module, where NVIDIA® has a place of business at 2788 San Tomas Expressway, Santa Clara, California 95051 or a RASPBERRY PI® (where RASPBERRY PI® is a federally registered trademark of the Raspberry Pi Foundation private limited company of the United Kingdom located at 30 Station Road, Cambridge, United Kingdom CB12JH).

At least one three-dimensional measurement device 12, e.g., LiDAR camera, (probably two) can include, but is not limited to, an INTEL® RealSense™ LIDAR Camera L515. The Intel Corporation has a place of business at 2200 Mission College Blvd, Santa Clara, California 95054-1549.

At least one three-dimensional measurement device 12, e.g., a LiDAR camera, (probably two), can be used to take back-view images of individual sows 262. In addition, the three-dimensional measurement device 12 can acquire red-green-blue (RGB) color, infrared, and depth images simultaneously, and infrared and depth images can be collected at low-light conditions, e.g., nighttime conditions. Each three-dimensional measurement device 12 will be connected to control unit 254, that preferably includes an edge computing unit 274 through electronic communication; a nonlimiting example includes USB 3.2, for camera control, data acquisition, processing, analysis, and wireless communication. Preferably, but not necessarily, the wireless communication 276 is through a cloud platform, e.g., AMAZON® AWS®, owned by Amazon Technologies, Inc., having a place of business at 410 Terry Avenue, Seattle, Washington 98109.

A control program for the at least one three-dimensional measurement device 12 based on Python script and the Intel® RealSense™ Viewer SDK 2.0, manufactured by the Intel Corporation, having a place of business at 2200 Mission College Blvd., Santa Clara, California 95054, for initializing the at least one three-dimensional measurement device 12 and takes images on demand.

An electronic touch screen display 278, shown in FIG. 3, can be utilized to visualize the images and provide manual control. In addition, a remoter (not shown) will be used to manually operate the robotic platform 252 and at least one three-dimensional measurement device 12. In addition, a remote desktop (not shown) will be set up to allow remote control of control unit 254 for tuning and troubleshooting. Preferably, but not necessarily, a web-based control platform based on a cloud IoT platform, a nonlimiting example being AMAZON® IoT Core®, for remote control of the control unit 254.

The robotic imaging system 250 will work in patrol mode to conduct routine data collection or manual mode as needed. Limit switches (not shown) on the overhead rail track 256 will instruct the motorized trolley 258 to stop at an accurate location behind a sow 262 and take images at an ideal angle. Images are preferably taken at predetermined intervals, e.g., ten minutes, to quantify activity patterns. In experimentation, it currently requires about three seconds to acquire images for each sow, resulting in four hundred sows in ten minutes using two of the three-dimensional (3D) measurement devices 12.

Figure 16:
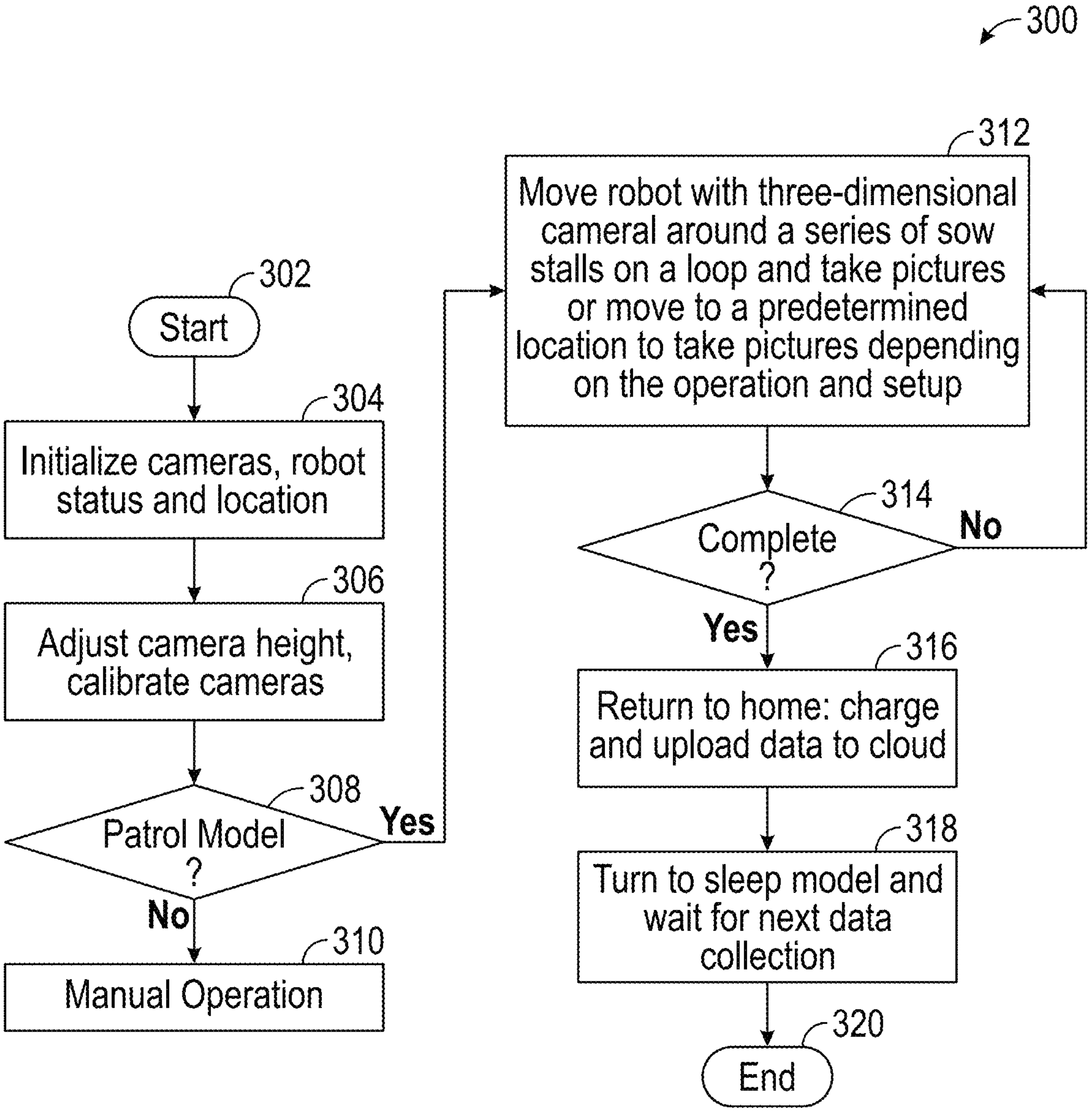
FIG. 16 is a control flowchart of the robotic system of the present invention.

The patrol mode working process is generally indicated by the numeral 300 and illustrated in FIG. 16. The steps in this flowchart are indicated by numerals <nnn>. The first step is to initialize the process <302>. This is followed by initializing the three-dimensional measurement device(s) 12 and motorized trolley 258 along with the location <304>. This step is followed by adjusting the height of the three-dimensional measurement device(s) 12 and providing calibration <306>. The next step is to determine <308> if the autonomous patrol model is going to be used <312> or if an operator-controlled manual operation <310> will take place. If the autonomous patrol model is used <312>, then the motorized trolley 258 for large-scale sow operations circles in a loop for the most accurate methodology of obtaining vulvar data or for smaller operations is moved to a predetermined position, and images are taken with the three-dimensional measurement device(s) 12. A determination is then made if the process is complete <314>. If not complete, step <312> is repeated, and if this step is complete, then the motorized trolley 258 returns to home to charge and upload data to a cloud <316>. The process then turns to a sleep mode and waits until another data collection occurs. The end of this process is indicated by step <320>.

Collected images of each sow 262 will be processed in real-time to extract different image features that will be used to assess the activity, body condition, and estrus status. The image processing and analysis pipeline will include different modules that are extendable, including posture recognition, vulva assessment, and body condition assessment. As illustrated in FIGS. 14 and 15, images will first be processed to identify the sow's postures (standing, lying, and sitting) that will be logged as activity patterns. The vulva conditions and body conditions can be assessed in a standing posture, while the girt length will be measured in a lying posture. Initially, collected images of each sow 262 will be processed in real-time to extract different image features that will be used to assess the activity, body condition, and estrus status. The image processing and analysis pipeline can include different modules that are extendable, including posture recognition, vulva assessment, and body condition assessment. As illustrated in FIGS. 14 and 15, images will first be processed to identify a sow 262's postures (standing, lying, and sitting) that will be logged as activity patterns. The vulva conditions and body conditions will be assessed in a standing posture, while the girt length will be measured in a lying posture.

Figure 17:
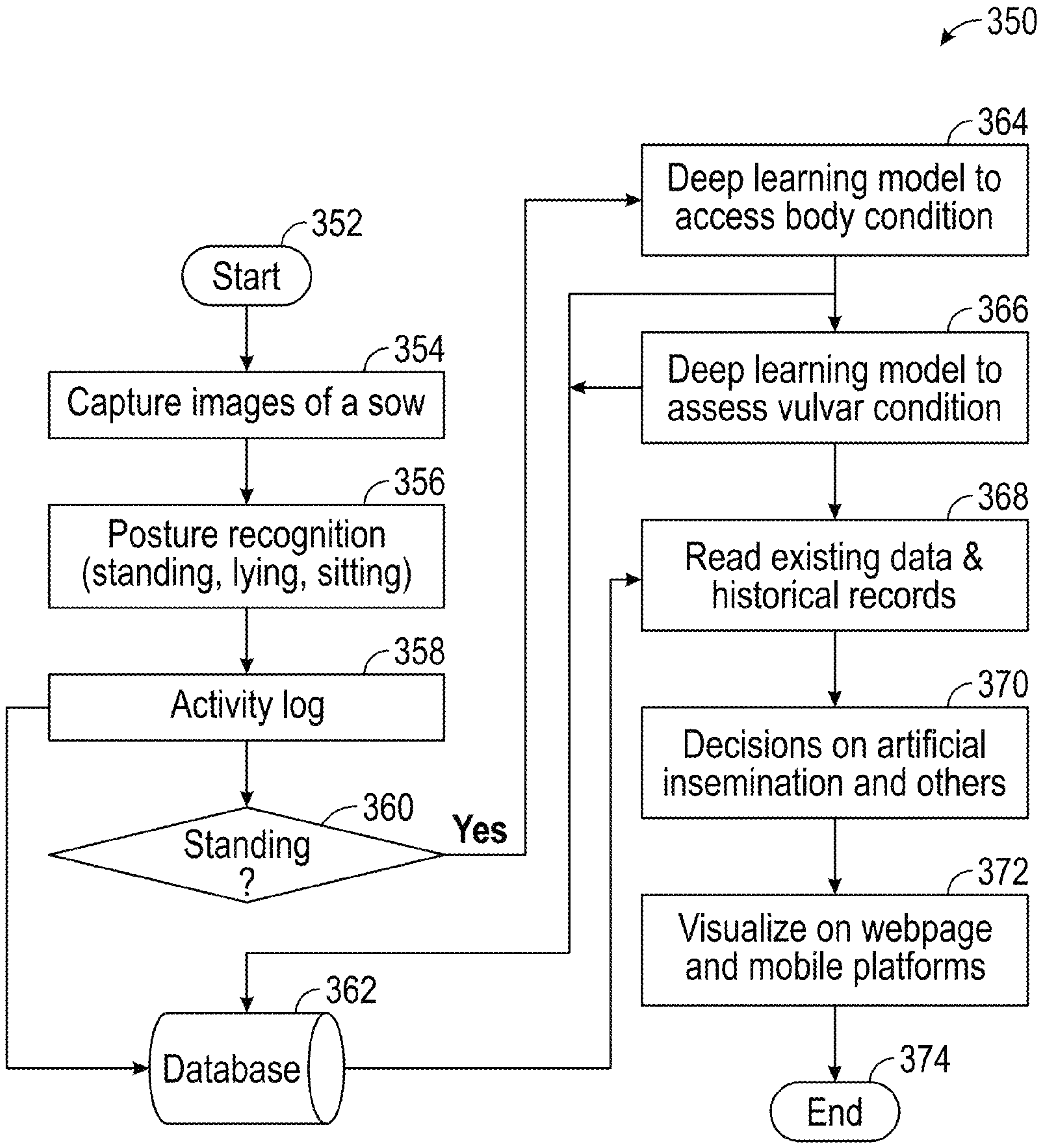
FIG. 17 is a flowchart of image processing and analysis associated with the present invention.

The image processing and analysis process is generally indicated by the numeral 350 and illustrated in FIG. 17. The steps in this flowchart are indicated by numerals <nnn>. The first step is to initialize the process <352>. This is followed by capturing images of a sow 262 <354>. This step is followed by posture recognition of the sow 262 to determine if the sow 262 is standing, lying, or sitting <356>. The next step is to create an activity log <358> and determine if the cow 262 is standing. The determination of the position of the sow 262 is provided to a database <362>.

If the cow is standing in step <360>, then a deep learning model is utilized to access body condition <364>. This information is provided to the database <362>. The next process step is to utilize a deep learning model to assess vulvar condition <366>. This is an ongoing process where the next step is to make comparisons to existing data and historical records <368>. Based on this analysis, decisions on artificial insemination and other decisions involving the sow 262 can be made <370>. This information can be visualized on a wide variety of electronic devices, webpages, and mobile platforms <372>. The end of this process is found in step <374>.

Figure 22:
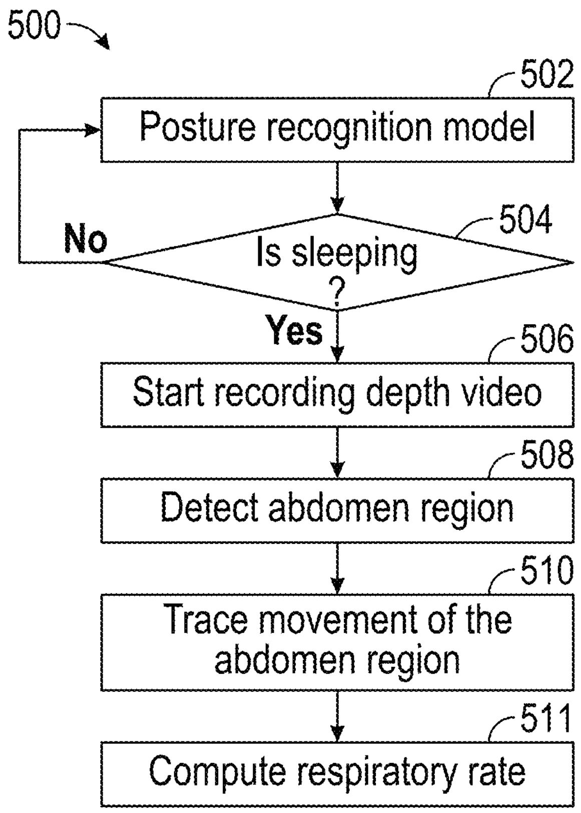
FIG. 22 is a flowchart of image processing and analysis associated with the respiratory rate of a sow.
Figure 23:
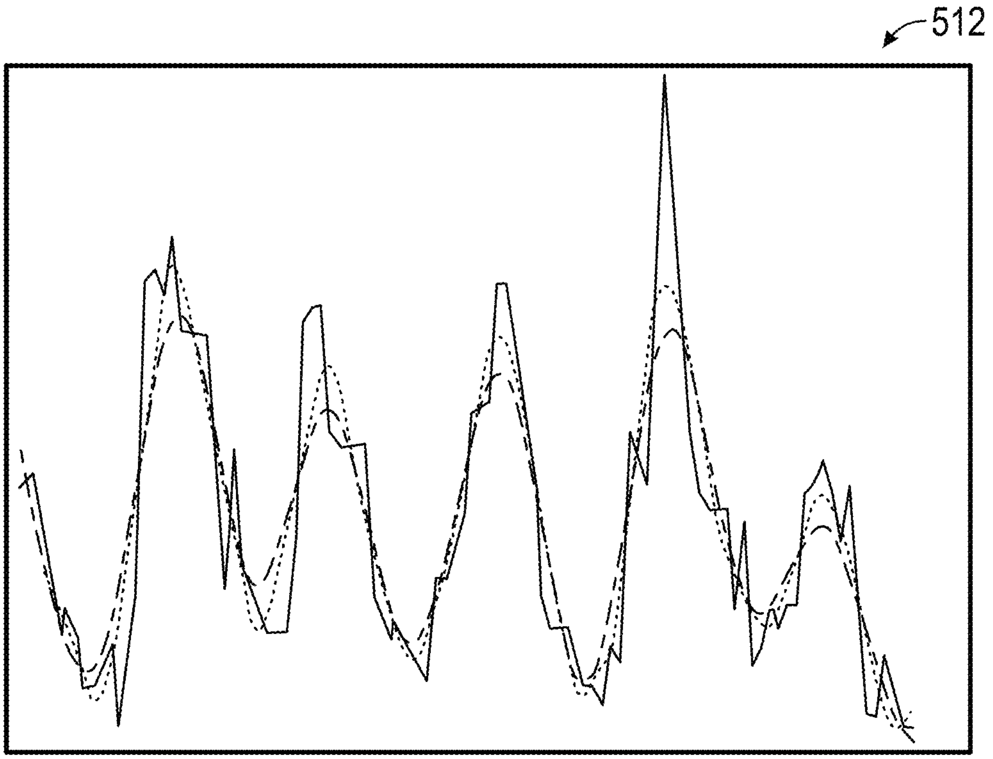
FIG. 23 is a graphical representation of a sow's computed respiratory rate.

An important tool that can be utilized when the sow 262 is sleeping in a lateral lying position is to evaluate the respiratory rate of the sow 262 based on the movement of the abdomen of the sow 262 captured by a three-dimensional measurement device(s) 12. An illustrative, but nonlimiting, video capture rate is twenty frames per second. Referring now to FIG. 22, the initial steps of the posture recognition process 350 from FIG. 17 are applied to a respiratory rate analysis 500. This includes a posture recognition model <502> that is comparable to step <356> in FIG. 17. However, the determination is focused on whether the sow is lying down and/or sleeping <504>. If the response from the three-dimensional (3D) measurement device 12 is negative, the process will loop to the previous step <502>, but if positive, the process will proceed to the next step <506>, which is to start recording a depth video <506>. Next, there is a focus on the abdomen region of the sow 262 as step <508>. This is followed by tracing the movement of the abdomen region <510> of the sow 282. The respiratory rate <511> is then computed. This computed respiratory rate is shown by the numeral 512 in FIG. 23. Respiratory rate is extremely beneficial and advantageous in determining sow estrus.

The activity patterns refer to the time length of different activities that a sow 262 maintains. Activity patterns will be quantified by monitoring sow postures (sleeping, sitting, and standing). Activity patterns can be used as a physical sign of estrus and health conditions. For example, sows and gilts approaching estrus have higher activity levels and restlessness. Continuous monitoring of individual sows 262 will acquire the baseline information when they are at normal conditions and improve estrus detection accuracy. Sow postures will be identified using a convolution neural network ("CNN") model based on infrared images that are available at low-light conditions, which includes nighttime. In a preliminary study, a CNN model was able to correctly classify the sow posture into standing, sitting, and lying with an accuracy of 100%. This model takes 0.097 seconds for an edge computing unit, e.g., RASPBERRY PI® (where RASPBERRY PI® is a federally registered trademark of the Raspberry Pi Foundation private limited company of the United Kingdom located at 30 Station Road, Cambridge, United Kingdom CB12JH. This is an illustrative example with similar models that can be utilized to identify the posture of sows 262.

Assessment of vulva conditions will include vulva size (swelling), redness, and mucous discharge, which are common biological signs of approaching estrus. Compared to signs of activity patterns, vulva conditions are independent of sexual behaviors and more dependable in detecting estrus. The data processing in the present invention includes vulva region recognition, vulva segmentation, discharge recognition, size, and color quantification. A deep learning model, U-Net, that is widely used in segment images such as finding brain tumors from MRI images, can be utilized to successfully identify a sow's tail, rectal, and vulva region from IR images in 0.9 seconds using the RASPBERRY PI® (where RASPBERRY PI® is a federally registered trademark of the Raspberry Pi Foundation private limited company of the United Kingdom located at 30 Station Road, Cambridge, United Kingdom CB12JH. In addition, a manual method to quantify the vulva dimension and volume from the depth image by improving the model's performance by testing different object detection algorithms, e.g., Single Shot Box Detector, developing an automated image processing pipeline to calculate vulva volume in real-time and developing deep learning models to quantify vulva redness level and mucous discharge. Combining IR, RGB, and depth images can improve the accuracy and identify reliable signs for estrus detection and other reproduction performance.

A sow 262's body condition is usually quantified as a body condition score ("BCS") with five levels (one through five) based on the sow's back-fat thickness, which is measured by an ultrasound machine or a caliper. The present invention utilizes a deep learning model to quantify the BCS of each sow automatically. A mixed CNN will be used to process imagery data, and a multilayer perceptron network to manage numerical and categorical data, i.e., age, parity number, and/or breed, which will be configured in parallel. Finally, the learned features will be concatenated and fed to a subsequent network to assess body conditions.

Figure 18:
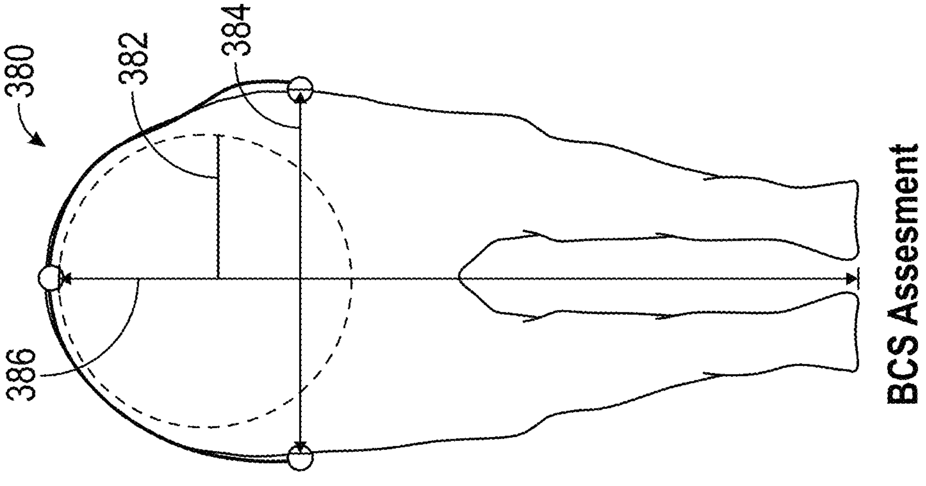
FIG. 18 is a BCS assessment utilizing a sow's rump width, height, and radius of curvature.

Referring now to FIG. 18, image features are generally indicated by numeral 380 and include the radius of incircle 382, i.e., dash line circle, rump width 384, and rump height 386, which will be calculated automatically to assess the sow's body condition. In addition, the BCS will be used to adjust the daily feed quota that is optimized for their reproductive traits.

Locomotive disorder is one of the leading causes of sow replacement at early parity. It is found that the structural soundness is strongly associated with the productive lifetime of a sow. In practice, trained workers evaluate the structural soundness and rank the severity of structural disorder of sows or gilts by visually observing their rear legs, which is time-consuming and subjective.

Figure 19:
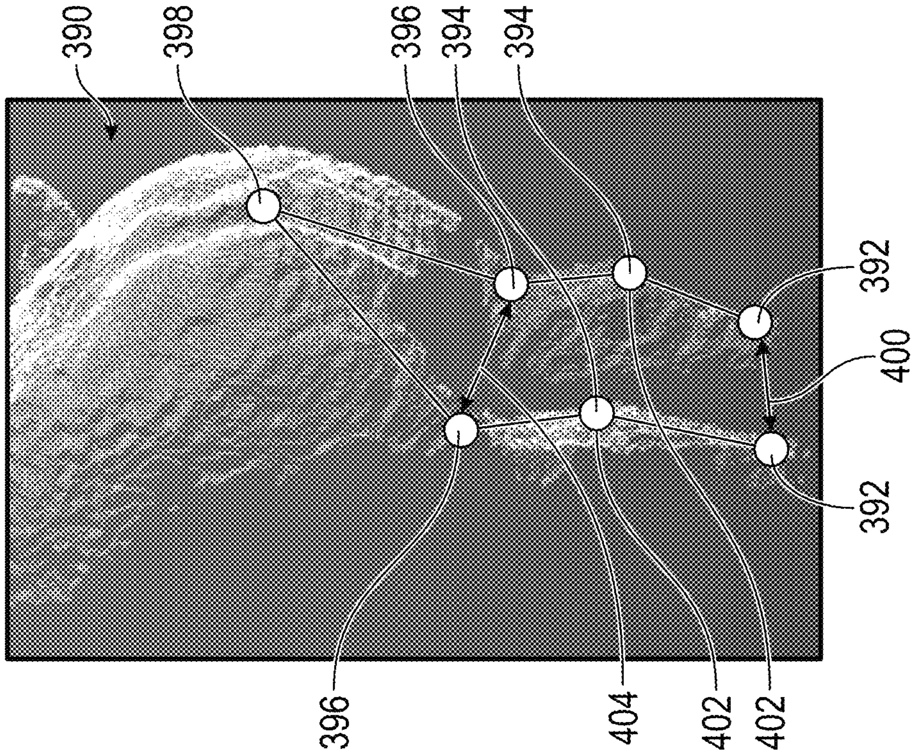
FIG. 19 is an illustration of a structural soundness assessment for a sow.

Referring now to FIG. 19, to evaluate the sow's structural soundness, depth images are generally indicated by the numeral 390. The key points are F: Feet 392; A: Ankle 394; H: Hind 396; and V: Vulva 398, which will be identified in-depth images using a deep learning model, e.g., ResNet, to describe the leg structure. ResNet is an artificial neural network ("ANN"). It is a gateless or open-gated variant of the HighwayNet, the first working very deep feedforward neural network with hundreds of layers, much deeper than previous neural networks. Skip connections or shortcuts are used to jump over some layers. Typical ResNet models are implemented with double-layer or triple-layer skips that contain nonlinearities (ReLU) and batch normalization in between.

Some symptoms of a sow with poor structural soundness include large ankle angle (A) 402, small feet distance (F-F) 400, and significant difference between feet distance and ankle distance (H-H) 404. Using the extracted features from the key points, machine learning models such as KNN, random forest, and multilayer perceptron neural network, will be evaluated to identify sow with rear leg structural disorder. A scale of ten levels, i.e., 1-10, can be assigned to indicate the severity level.

A robotic imagery platform can be utilized to monitor sows with automated image processing and analysis pipelines based on edge-computing with image features of sows utilized for future analysis along with post-processed methods or use cloud-computing platforms.

It is believed that biological signs of vulva conditions, including swelling, redness, and discharge, are reliable indicators of estrus. These biological signs are caused by the rise in estrogen level, independent of the sow's body condition or its sexual interest towards boars. However, visual evaluation of change in vulva conditions can be inaccurate, inconsistent, and difficult to implement in practice by workers. The acquired data from the proposed robotic imaging system can be used to develop a decision support system for the identification of standing estrus and the optimum time for artificial insemination.

Figure 1:
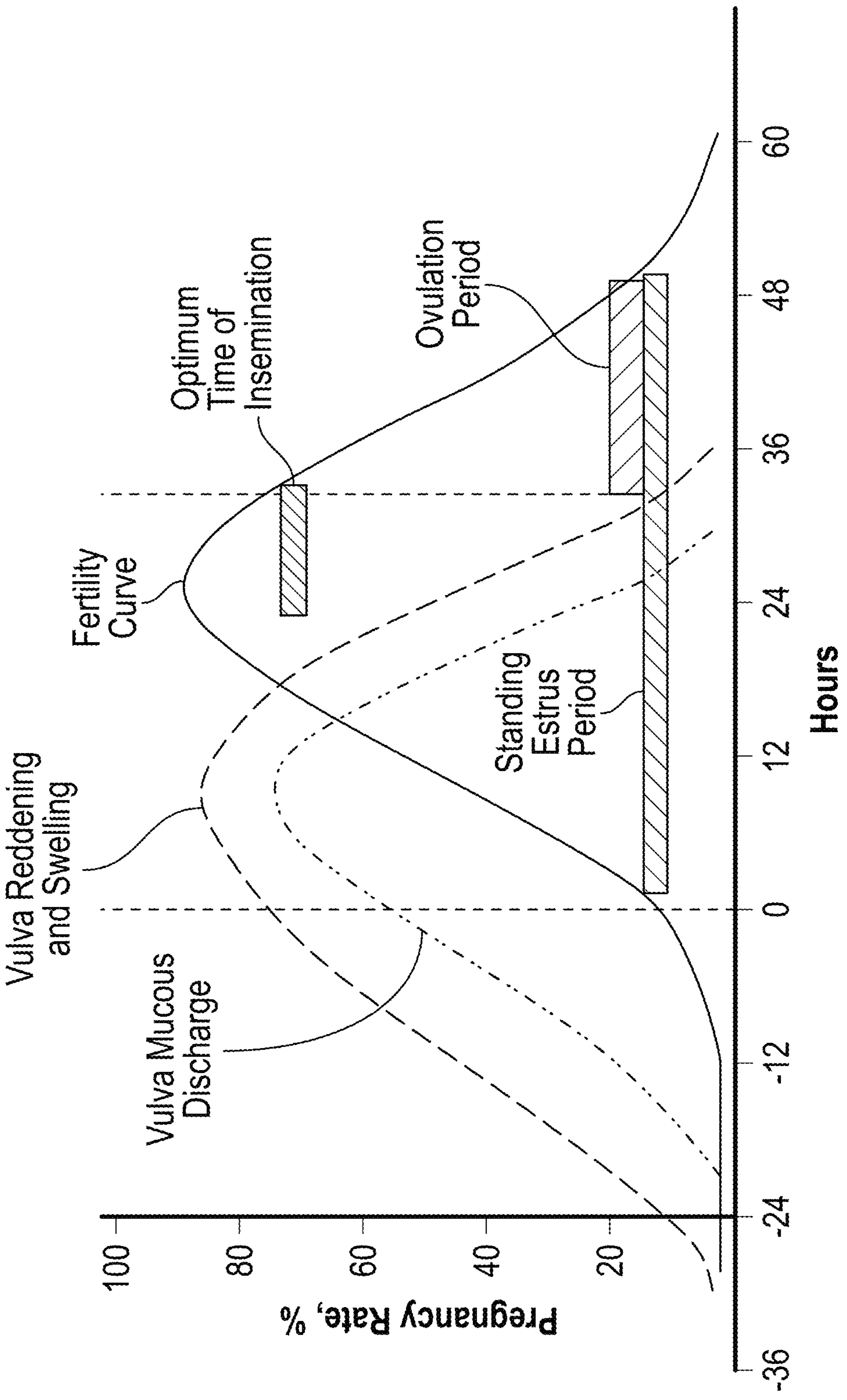
FIG. 1 shows a graphical representation of the optimal time for artificial insemination to improve the pregnancy rate for sows.
Figure 2:
FIG. 2 (Prior Art)
FIG. 2 is prior art that demonstrates the traditional methodology to determine estrus through a Back Pressure Test (BPS).

As shown in FIG. 1, the standing estrus or in-heat usually shows up right after the peak of vulva swelling and discharge. It is expected to identify the standing estrus by continuously monitoring the vulva conditions and activity patterns. A deep learning estrus detection model consisting of a multivariate long short-term memory ("LSTM") model will be developed to predict the standing estrus for each sow using the time-series data of activity and vulva conditions, combined with categorical data, e.g., parity, BCS, breed, and so forth.

Figure 20:
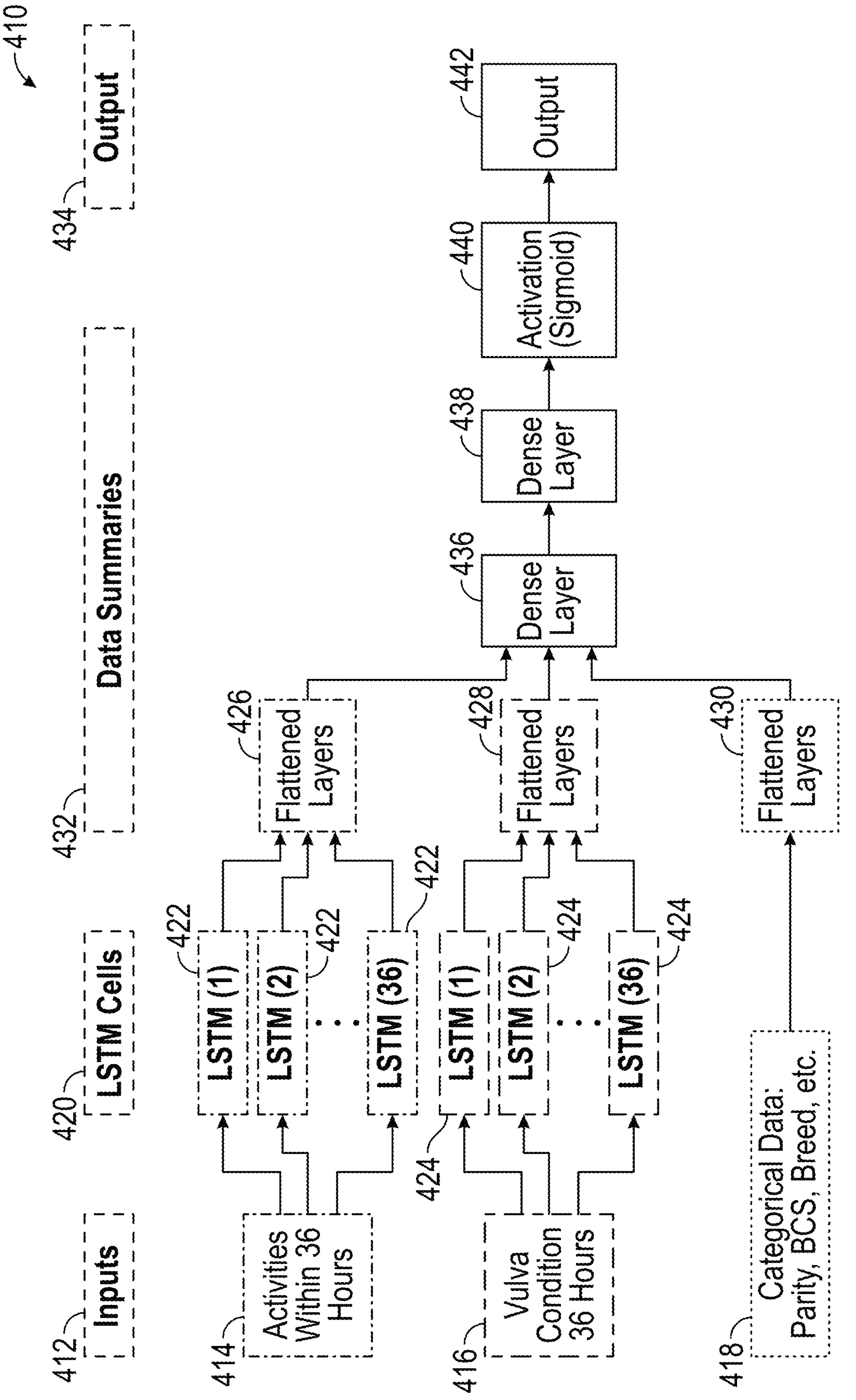
FIG. 20 is one illustrative, but nonlimiting, type of architecture of the estrus detection model utilizing one deep learning tool as merely an example.

The architecture of the LSTM model is generally indicated by the numeral 410 in FIG. 20. The inputs 412 include time-series data (activity 414 and vulva 416) of the last one to two days, e.g., 36 hours, which will first be segmented based on the hyperparameters, such as window size and overlap ratio, and then selected and passed into LSTM cells, generally indicated by numeral 420, and specifically indicated by numerals 422 and 424, respectively, to generate hidden feature variables. The hidden feature variables in the form of flattened layers 426 and 428, respectively, will be concatenated with the categorical data 418, such as time from weaning, parity number, BCS, and sow breed in a flattened layer 430. The concatenated layers 426, 428, and 430 will be fully connected to dense layers 436 and 438 then using "ReLU" activation function, and then use "Sigmoid" activation function 440 as part of the data summaries 432 to generate outputs 434. The final output 442 will be a number between 0 to 1, where "0" indicates no estrus and "1" is for standing estrus. When a sow is approaching standing estrus, which is close to 1, farmers will be notified to make further management decisions, e.g., artificial insemination, a double-check, and so forth. This is only one illustrative, but nonlimiting, type of deep learning tool, and numerous other types can be utilized with the present invention.

All processed data and results can be uploaded in real-time to a cloud platform, e.g., AMAZON® AWS®, owned by Amazon Technologies, Inc., having a place of business at 410 Terry Avenue, Seattle, Washington 98109. Basic information about each sow/gilt, including ear ID (electronic ID tag), breed, age, and reproductive information, will be established when they are added to the system and will keep updating. All data generated from this CPS system, management data (e.g., feeding and drinking, stall location), and reproductive data, e.g., KPIs, weaning date, parity number, will be associated with each sow (ID). User interfaces for websites and mobile devices will be developed to visualize data, monitor information of sows, and make management plans.

Figure 21:
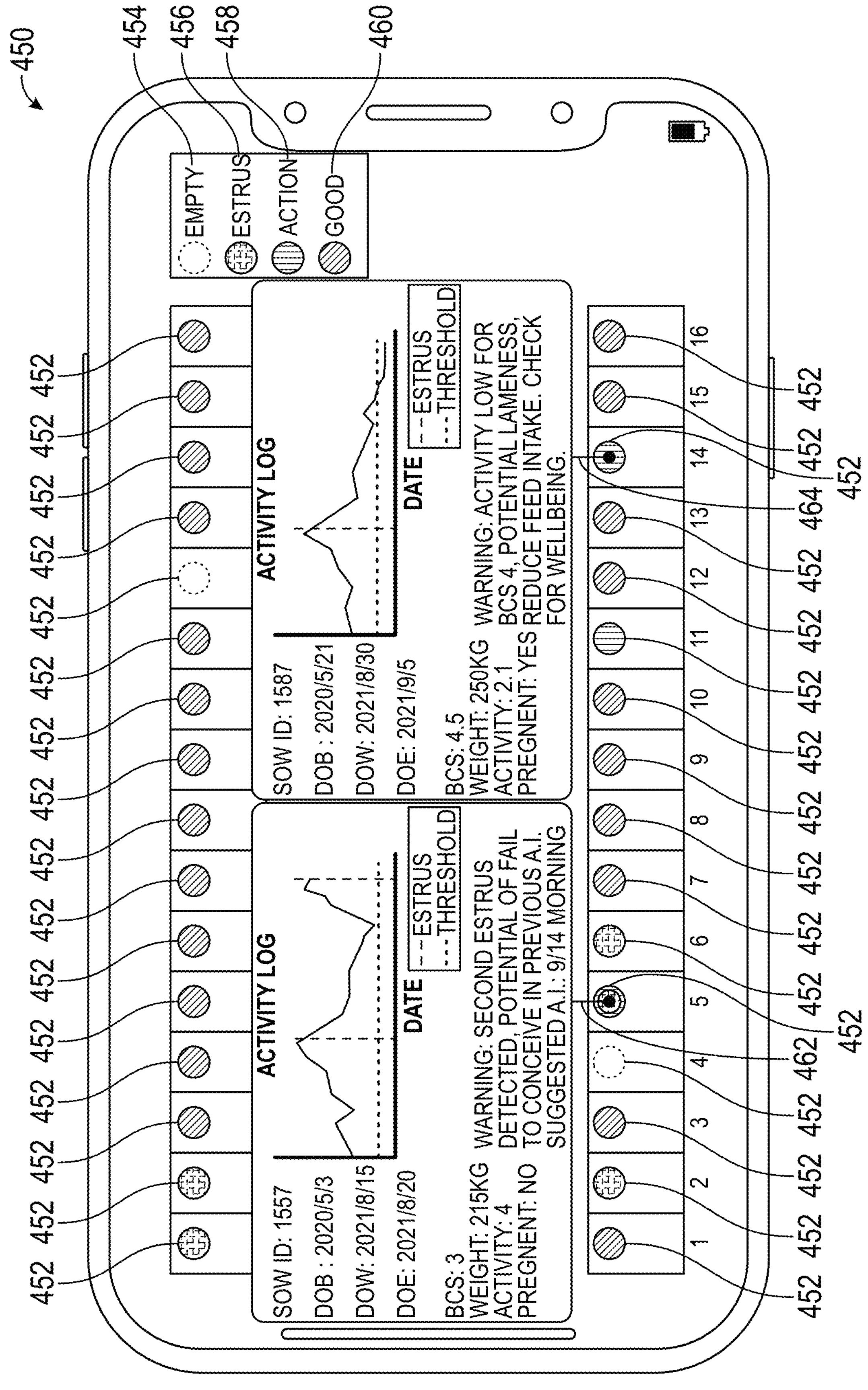
FIG. 21 is an illustrative example of a mobile application user interface.

One illustrative, but non-limiting, example of an interface is shown in FIG. 21 and is generally indicated by the numeral 450. There are a series of sow stalls and associated sows indicated by the numeral 452. The user can access the tailored instruction for each sow via the website, mobile application, or patrol robot's touch screen. Important actions, including artificial insemination, farrowing (litter size, number of born alive, and so forth), and replacing a sow (specific mortality reasons, farrowing reasons, and so forth), along with the timing of the performed action, will be logged into the system. These records will serve as feedback to improve the decision-making neural network models' performance. In this non-limiting example, there can be an indication that the sow stall is empty 454, the sow is in estrus 456, action needs to be taken 458, and the sow is in good condition, and no action needs to be taken at this time 460. In addition, there can be stalls 452 identified and clicked 462 and 464, respectively, to reveal an activity log such as sow ID, DOB, DOW, DOE, BCS, date of birth, weight, activity, pregnancy status, warnings regarding topics like food intake, and so forth.

Ovulation usually happens at two-thirds of a standing estrus period (FIG. 1), which is considered the optimum time for artificial insemination to achieve the maximum pregnancy rate. However, due to the variation of length in a standing estrus period, it is difficult to determine the exact time of ovulation. Although ovulation can be manually measured using ovulation detectors, the method is invasive and brings plenty of stress to sows or gilts. There is no existing knowledge on the detection of ovulation using behavioral and biological signs. How to determine the optimal time to conduct artificial insemination is also unclear. It is believed that a prediction model based on machine learning models, e.g., KNN, neural network, using sensor data, e.g., standing estrus, activity, and vulva conditions, and reproductive performance data, e.g., pregnancy rate, farrowing rate, and litter size, can be utilized. Meanwhile, we will consider the BSC, parity, and other factors that may affect their reproductive performance. However, due to the large sow-to-staff ratio, it is impractical to inseminate one sow each time. Therefore, it is more valuable to provide a time window, e.g., two hours, for conducting artificial insemination on a batch of the sows. This model will output multiple parameters, such as ovulation time, an optimum time for artificial insemination, and a time window for insemination.

An AI-enabled model of the present invention can accurately monitor estrus status for identifying the optimum time window for artificial insemination and should reduce more than 50% labor input for estrus detection and save 50% of semen usage.

Data-driven decisions made through this present invention will be more efficient and improve reproductive performance than the current standard management procedure. The management decisions in sow farms typically include estrus checks, artificial intelligence, pregnancy checks, daily feed quota, and replacement (or cull decision). A sow's reproductive performance is quantified by the KPIs, e.g., litter size, farrowing rate, PW/MS/Y, piglet survival rate, and non-production days, which will be used as "golden criteria" to evaluate the performance of the data-driven decisions. If a sow's body condition is deviating from the target range during the gestation period, the CPS system will timely adjust feed accordingly to avoid overfeeding or underfeeding throughout the gestation stage. Sows with structural disorder symptoms usually have a high potential of pregnancy failure which is an important factor for culling or replacement. In addition, an abnormal activity level that deviates from its normal range (baseline) will be a good sign to alert farmers for further examination for potential sicknesses such as lameness and fever. If such a phenomenon is detected in a herd level, farmers could reach out for veterinary assistance.

In this invention, rear-view three-dimensional (3D) models of sows were acquired using a three-dimensional measurement device 12, e.g., LiDAR camera, which shows the capability of detecting the variation of sows' vulva volume around estrus. The increased blood flow due to the rise of estrogen level during estrous events may cause an increase in vulva size that can be used as an indicator of estrous events. The present invention shows that sows with larger vulva volume had a smaller percentage of increase in volume around estrus, which explains less sensitivity of vulva swelling in detecting estrus for older sows as previously described. In addition, the duration of swelling also varies significantly. Since vulva swelling is due to increased blood flow in the vulva region, such an increase should also lead to increased vulva surface temperature and intra-vaginal temperature. It is believed that vulva temperature would increase and then decrease prior to the onset of estrus. Capturing vulva volume data using more than one LiDAR camera while sows are being fed is believed will yield more consistent volume estimations. Another source of the variance is that the area of the removed depth information is larger than the actual vulva size. Accurately detecting the edge of the vulva region might further improve the accuracy of vulva volume estimation. In the present study, vulva volume data were collected around the third estrus after weaning. Therefore, it is believed that the changes in vulvar size around the third estrus cycle can be captured using the at least one three-dimensional measurement device 12, e.g., LiDAR camera.

Estrus should occur four to nine days after the last day of a Matrix® feeding. For the two sows that came in heat before vulva volume reached peak value, the significant increase in vulva volume was not detected until Days 8 and 9 post the synchronization removal. Therefore, in the early phase of the estrous cycle, producers should check for estrus when the vulva volume reaches peak value. If no significant increase in vulva volume was detected within seven days from the last day of a synchronizer feeding, the producer should check for estrus starting on the day when a significant increase in vulvar volume is detected by the three-dimensional measurement device 12, e.g., LiDAR camera. Since the significant change in vulva volume was detected in all sows before/on the first day of estrus, it can help avoid a missing estrus.

The estrus checking started on the third day after the synchronization removal and estrus detection was performed fifty-one times in total for the eight test sows. By following the suggested estrus checking guide based on the vulva volume change, producers would only need to perform estrus checking twenty-five times, saving about 50% of the labor input. Sows that do not become pregnant would be expected to return to estrus about twenty-one days later. Detection of that estrus is especially inefficient, especially on farms with high conception rates (low return to estrus), many of whom do not check for returns but instead identify non-pregnant sows late in gestation. The use of the technology of the present invention could identify these sows considerably earlier and reduce the number of non-productive days related to conception failure.

This present invention provides a novel method that uses a three-dimensional measurement device 12, e.g., LiDAR camera, to evaluate vulva swelling around the estrus. The findings demonstrate that two-dimensional (2D) and three-dimensional (3D) features from a three-dimensional measurement device 12, e.g., LiDAR camera, could detect the significant change in vulva size around the third estrus cycle. It is believed that vulvar size can be subjectively evaluated, and the change in vulvar size shows potential in that it can be used to identify the estrus in sows. Results also indicate that vulva volume (three-dimensional (3D) features) showed higher accuracy and reliability in detecting upcoming estrus. Swelling duration and intensity vary among different sows. Although sows with larger vulva volume had a smaller percentage of increase in vulvar volume around estrus, significant change in vulvar volume was still detected prior to the onset estrus event. It is believed that no sow was found having estrus before a significant change in vulva volume. Most of the sows showed the onset of an estrus event at or after vulva volume reached peak value. Detecting a significant increase in vulva volume can help accurately detect estrus of sows, reduce times of estrus check, and thus save labor and improve production efficiency.

Figure 24A:
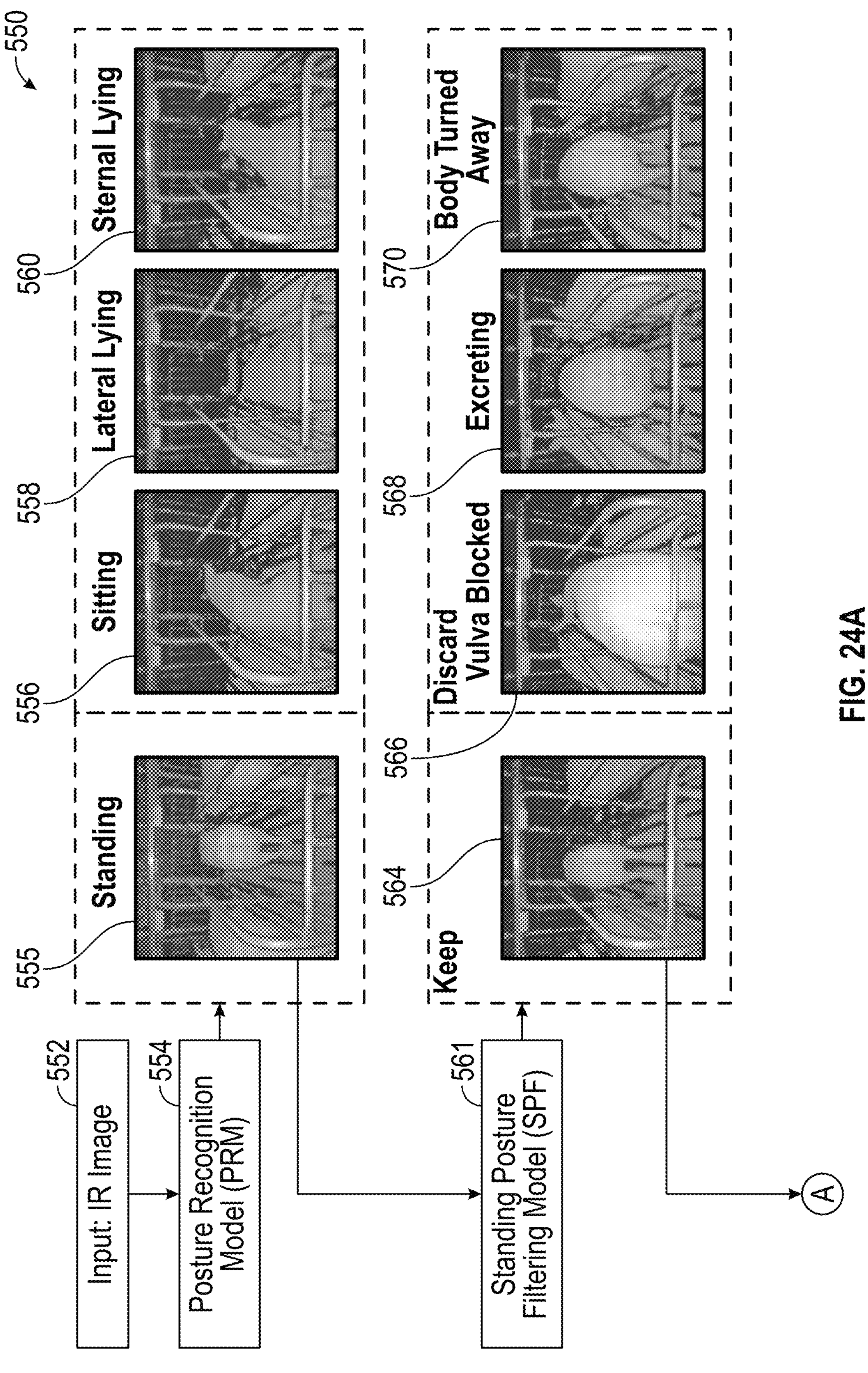
FIGS. 24A and 24B are an illustration of a designed image processing pipeline for vulva volume evaluation.
Figure 24B:
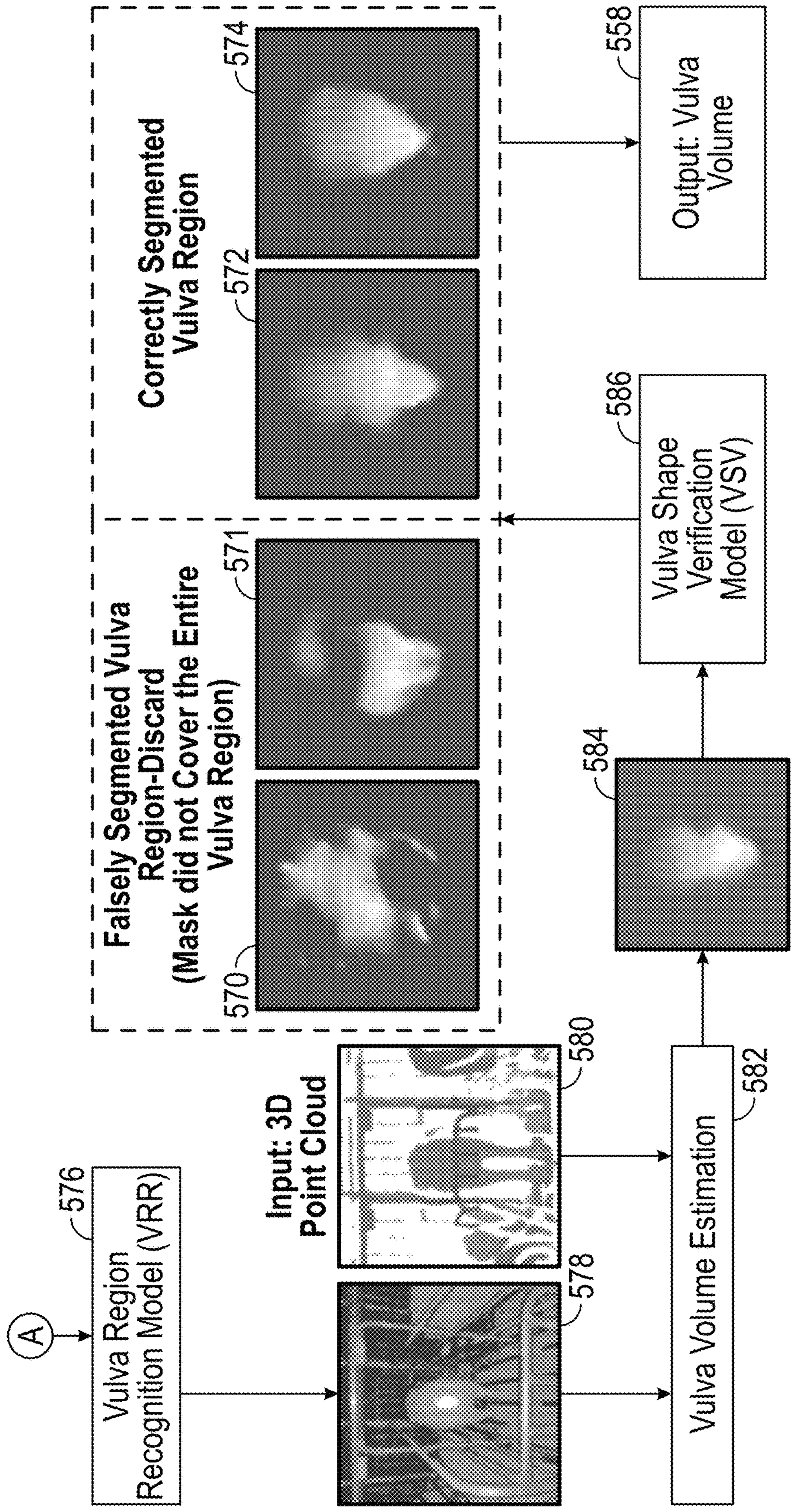

An image processing pipeline was developed to compute the vulva volume of sows using the collected imagery data, which is generally indicated by the numeral 550 in FIGS. 24A and 24B; that shows the workflow of the image processing pipeline using an IR image 552 and a point cloud 580 for vulva volume assessment. Using the aforementioned posture recognition model 554, the postures were classified into standing 555, sitting 556, lateral lying 558, and sternal lying 560, as described herein.

However, as shown in FIGS. 24A and 24B, a sow's vulva region can potentially be blocked by its tail or other objects, or not in the appropriate shape for vulva volume estimation due to some behaviors, e.g., excreting, turning away from the camera. In this study, the standing posture filtering ("SPF") 561, a classification model, was developed to identify those images that needed to be excluded from the dataset. Therefore, image 564 was kept while image 566 was discarded due to a blocked vulva, image 568 was discarded due to the process of excreting, and image 570 was discarded due to the sow's body turning away from view.

The selected images were used to extract the vulva region using an image segmentation model, i.e., the vulva region recognition model ("VRR" model) 576. All image pixels corresponding to the vulva region of sows from the selected IR images were identified and segmented 578. Because each IR image is physically aligned with its corresponding 3D point cloud (captured simultaneously) 580, vulva regions in the 3D point cloud were extracted automatically. Each IR image is stored in 8-bit unsigned integer format (~70 kilobyte/frame), and each 3D point cloud is stored in 32-bit float format (~5 megabytes per frame). The 3D point clouds were only used for evaluating the volume of the identified vulva region to reduce computing demand.

Vulva volume estimation 582 can then be performed. This can be implemented with MATLAB (R2020b, 168 MathWorks, Natick, MA, USA). After identifying the vulva region from the IR image 584, a segmentation box (pad 20 pixels in horizontal direction, pad 10 pixels in vertical direction) is applied on both IR frames and 3D point cloud to zoom in to the vulva region. Next, the segmented mask and 3D point cloud were resized to 300×300 pixels. The resulting 3D surface would be a 3×300×300 matrix that contains the spatial information of the region of interest in the XYZ domain. Next, the spatial information inside of the vulva mask was removed and replaced with new values by interpolating the nearby spatial information. The "Extracted vulva surface" was obtained by subtracting the "No Vulva Surface" from the "Original Surface." As shown in FIGS. 24A and 24B, images 570 and 571 are falsely segmented where the mask did not cover the vulva region and needed to be discarded. In contrast, images 572 and 574 are kept as having correctly segmented vulva regions. Therefore, the vulva volume 558 was computed from the "Extracted vulva surface" as described herein.

Finally, after extracting the 3D vulva surface, a classification model (vulva shape verification ("VSV") model 586 was used to detect and exclude incorrectly segmented 3D vulva surface, i.e., a portion of the vulva region was left out from the segmentation, image labeling, and model training. Imagery data from six sows was used as a training dataset, and those from two sows was used as a testing dataset for the standing posture filtering ("SPF") and vulva region recognition ("VRR") models.

The standing posture filtering ("SPF") model 561 was developed to remove the defect images with sow postures unfit for vulva volume evaluation from the datasets, as shown in FIGS. 24A and 24B. Images were manually labeled. A total of 1,800 IR images (150 images per sow per class×6 sows×2 classes) were labeled into two 5 classes: KEEP, and DISCARD, as the training dataset. The labeled images were horizontally flipped to increase the training dataset sample size (KEEP: n=1,800, DISCARD: n=1,800). The test dataset contains 504 images (KEEP: n=300, DISCARD: n=204) from the other two sows. The corresponding DI, DI3, and DIIR images were selected automatically from the labeled IR images. The training dataset was split into 80% training and 20% validation. Three pre-trained (based on ImageNet) deep learning architectures, including MobileNet, Xception, and DenseNet were selected to classify images into two classes, i.e., KEEP and Discard. The DenseNet architecture can achieve maximum information flow between the layers in the model and therefore has better feature propagation. The Xception model is a relatively new model that showed better accuracy on the ImageNet dataset compared to the DenseNet121 model. Finally, the MobileNet architecture is lite, efficient, and requires far fewer computation resources when compared to DenseNet and Xception. Each model was trained with 100 epochs, and the batch size was set as 32. The trained models were applied to the corresponding test dataset. The performance of the models was evaluated using accuracy and F1 scores using the four equations shown below:

$$\text{Precision} = TPTP + FP \quad \text{Equation 8}$$

$$\text{Recall} = TPTP + FN \quad \text{Equation 9}$$

$$F1\ \text{Score} = 2 \times \text{Precision} \times RecallPrecision + \text{Recall} \quad \text{Equation 10}$$

$$\text{Accuracy} = TP + TNTP + TN + FP + FN(4)236 \quad \text{Equation 11}$$

where, true positive ("TP") is the number of correctly classified images, false negative ("FN") is the number of misclassified images, and false positive ("FP") is the number of negative images that were misclassified.

This kept image 564 is processed by the vulva region recognition ("VRR") model. The classified images by the standing posture filtering ("SPF") model 561 (with IR images) were visually examined to discard images that are not suited for vulva volume evaluation. In one illustrative, but nonlimiting experiment, there were 1674 captured images from the eight sows that had suitable standing postures (Labeled as "KEEP" for the SPF model) for vulva volume evaluation. A vulva region recognition ("VRR") model 576 was developed to identify the vulva regions in the images. The vulva region of each sow was labeled using an imaging labeling platform Apeer (ZEISS, Germany), based on the visible images (RGB images directly from the LiDAR camera) that were captured when indoor light was on. Because it was difficult to draw a clear boundary between the sow's vulva region and rectal region, manually labeled vulva masks might contain a part of the sow's rectal region. In addition, the labeled vulva masks were slightly larger than the actual vulva region (i.e., a small margin at the edge of the vulva region). A vulva mask of 480×480 pixels with values of zeros was built to select the region of interest, where the labeled vulva region was set as "1". One of the advantages of the U-Net network is the large number of feature channels which allows contextual information to propagate through the model. A U-Net neural network architecture was implemented on Google Colaboratory 256 to classify each pixel into one of the two classes (i.e., 0: background, 1: vulva) for each imagery type (i.e., IR, DI, DI3, and DIIR). A total of 857 images from six sows were labeled as a training dataset. The labeled masks and the corresponding raw images (i.e., IR, DI, DI3, and DIIR) were augmented by flipping horizontally to increase the training dataset sample size (n=1, 714). The dataset was divided into 80% training and 20% validation. Each model was trained with 100 epochs, and the batch size was set to 16. The trained models were then tested on a testing dataset that consisted of 399 images (images with suitable standing posture captured during the experiment) from the other two sows.

Figure 25:
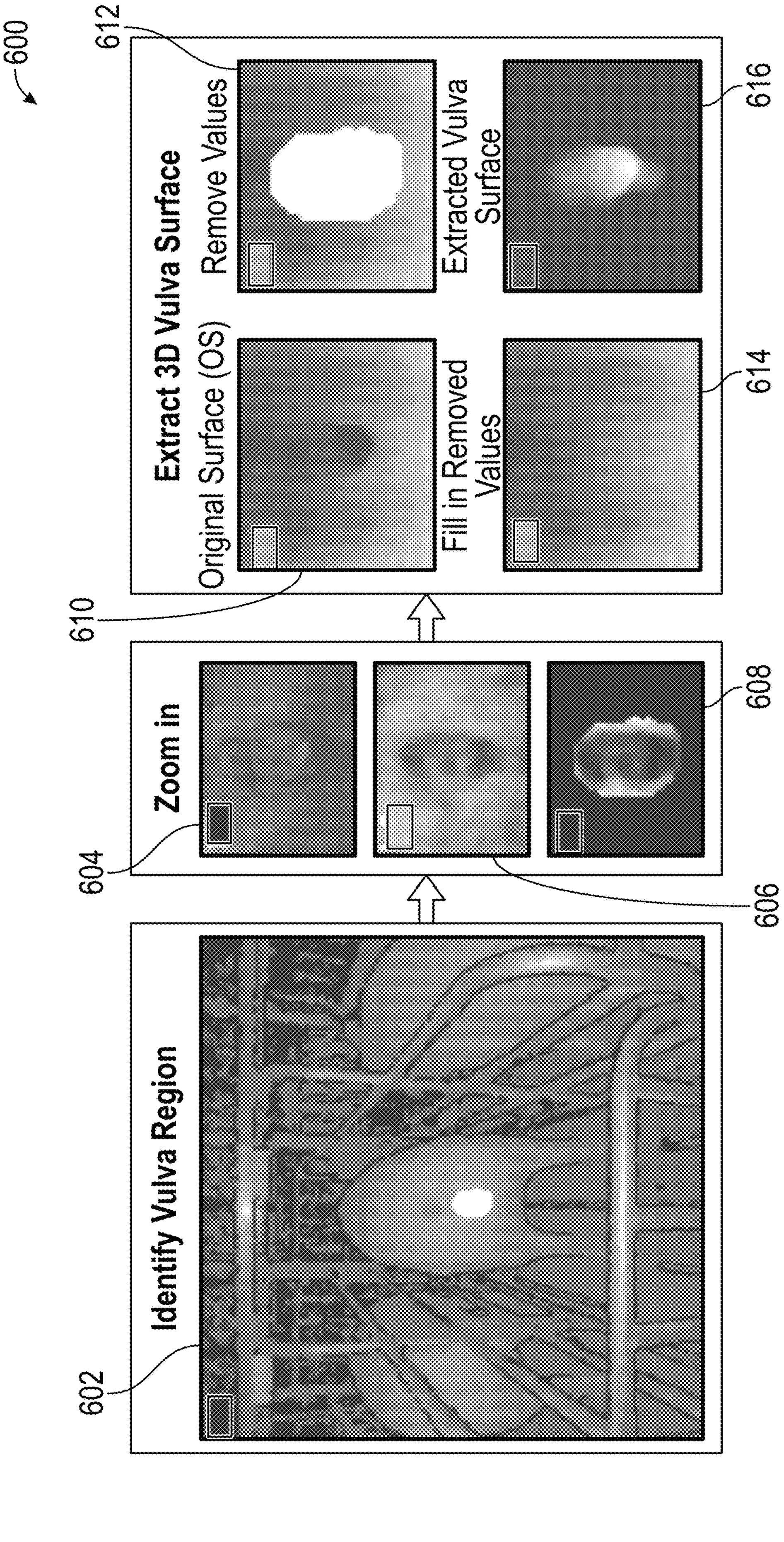
FIG. 25 is an extracted 3D vulva surface using segmentation and a 3D point cloud with an IR image overlayed with a vulva mask, a zoomed-in RGB image, a zoomed-in IR image, a histogram equalization applied to a zoomed-in IR image overlayed with vulva mask, an original surface image, image with removed spatial information inside vulva mask, image with fill in removed values, and an image that subtracts the fill in removed values from the original surface.

Referring now to FIG. 25, which illustrates the image processing process for each vulva volume computation. The figure representation of the process for each vulva volume computation using the input image (i.e., IR, DI, DI3, and DIIR) and the corresponding mask was saved as an image. These figures were then visually examined to validate whether the vulva region recognition ("VRR") model successfully identified the entire vulva region. A generated vulva mask was considered successful if the mask contained the entire vulva region (with a small margin at the edge) and the sow's tail was completely excluded from the vulva mask. The vulva region recognition ("VRR") model's performance for each imagery type was evaluated based on the success rate of identifying the vulva region. The training performance of the vulva region recognition ("VRR") model was evaluated based on the success rate from the labeled images (six sows, n=857). The validation performance of the vulva region recognition ("VRR") model was evaluated based on the success rate of the images captured when the room had low or no ambient light (six sows, n=418). Finally, the test performance of the vulva region recognition ("VRR") model was evaluated based on the success rate from the testing dataset (two sows, n=399). The images used for evaluating training (n=857), validation (n=418), and test (n=399) success rate together make up for the dataset (n=1674) used for vulva volume evaluation during the experiment. In FIG. 25, there is an IR image overlayed with the vulva mask generated by the vulva region recognition ("VRR") model 602, a zoomed-in RGB image 604, a zoomed-in RGB image 606, a histogram equalization applied to zoomed-in IR image that is overlayed with a vulva mask 608, an original surface 610, the same image with removed spatial information inside vulva mask 612, image with removed values filled in 614, and an extracted three-dimensional vulva surface 616.

The vulva shape verification ("VSV") model was developed to determine whether the computed vulva volume should be discarded. In scenarios where the vulva region was not correctly extracted, the computed volume should not be recorded. Images of the extracted vulva region and the background were saved during the computation of the vulva volume. The correctly extracted vulva region and the incorrectly extracted vulva region were labeled into two classes during the evaluation of the vulva region recognition ("VRR") model's performance. Image augmentation, i.e., flip, distortion, scale, and so forth, is an effective strategy to improve a trained model's generalizability when handling a limited dataset. From the masks that were generated by the vulva region recognition ("VRR") model using DI images as input, all of the incorrectly extracted vulva shape images of the eight sows (n=129) were augmented by flipping horizontally, vertically stretching by 20%, horizontally stretching by 20%, 298 scaled up by 20%, and scaled down by 20% using OpenCV. The augmentation was performed to 299 increase the variation and the size of the training dataset. Images of the correctly extracted vulva region were down-sampled to handle class imbalance. The dataset (Correct: n=774, False: n=774) was divided into 80% training, 10% validation, and 10% testing. Two types of images (1: "No vulva surface"—NV, 2: "Extracted vulva surface"—EV) were tested as input for the VSV model. The NV images were used to determine if the vulva region was entirely segmented out by the VRR model because a portion of the vulva region was difficult to visually identify from the extracted vulva shape (EV image). Another common reason for the incorrect vulva shape extraction was the vulva mask containing part of the spatial information of the tail.

Three pre-trained (based on ImageNet) deep learning architectures (MobileNet, Xception, and DenseNet) were implemented on Google Colaboratory and tested on each type of image as illustrative and nonlimiting examples. Each model was trained with 100 epochs, and the batch size was set as 32. The performance of the models was evaluated using accuracy and F1 scores in the equations shown below:

The Vulva volume quantification is where the vulva volume of each sow was calculated using the vulva shape extracted by the mask generated from the DIIR images. Vulva volume computed from the incorrectly extracted vulva shapes (n=81) was discarded. The daily vulva volume (V) of each sow was calculated as the mean of vulva volume values recorded within 24 hours (from 0:00 to 24:00). Day from the onset of estrus (DFO) was defined as the number of days from the first day (DFO=0) when a sow was first identified as having the onset of estrus by breeding technicians using the BPT method. In this study, the average value of the three smallest daily vulva volumes were observed from weaning was considered as the minimum (normal) vulva volume (MV) of the sow. MV represents the volume of the vulva region under normal conditions that showed no sign of swelling or redness. Daily percentage increase in vulva volume (ΔV) and maximum increase in vulva volume (ΔVm) around the onset of estrus were defined by the following Equations:

$$\Delta VDFOi = VDFOi - VDFOi - 1VDFOi - 1 \times 100\% \quad \text{Equation 12}$$

$$\Delta Vm = \max(VDFOi < 3) - MVNV \times 100\%, \quad \text{Equation 13}$$

Figure 26:
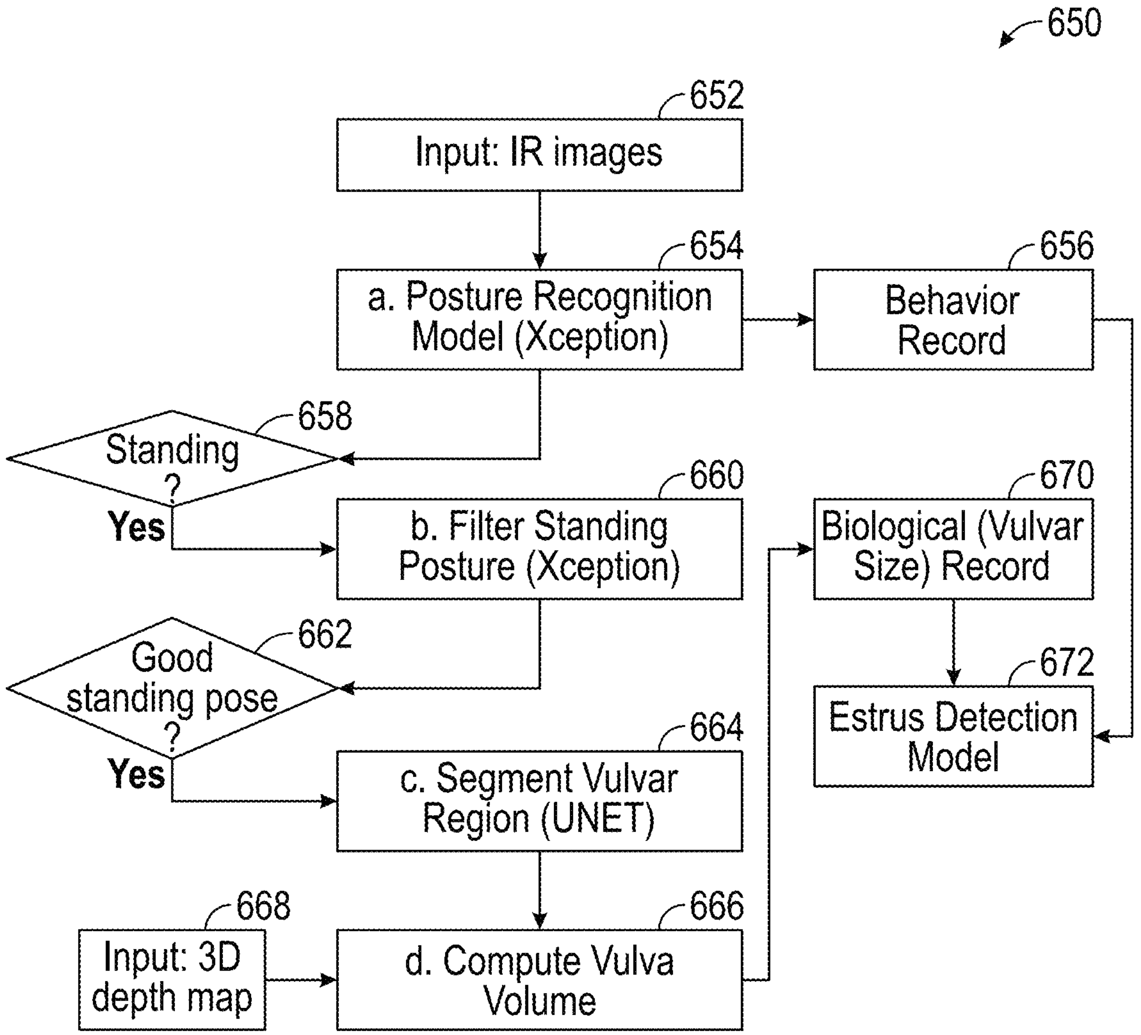
FIG. 26 is a flowchart of the robotic imaging system and image process pipeline.

Referring now to FIG. 26, an image processing pipeline flowchart was developed to extract behavior records and evaluate a sow's vulvar size from the collected imagery data. The steps in this flowchart are indicated by numerals <nnn>. The first step is to receive the IR images <652>. A decision tree model for estrus detection was implemented using behavior and vulvar size records from twenty-six sows. The sows that were not used to train the estrus detection model were either not pregnant (based on ultrasound test) or did not have sufficient imagery data with suitable posture for vulvar size evaluation around the onset of estrus events. The postures refer to sows that are standing (not defecating), the vulvar region is not blocked by the tail, and the body orientation is centered in the camera's field of view.

The next step is a posture recognition model <654> was developed to extract the behavior patterns of sows. This posture information is sent to create a behavior record <656> that forms part of the estrus detection model <672>. This process also includes evaluating a daily standing duration <658> (STA24: portion of standing posture in a 24-hour window evaluated at 12 PM) is filtered out <660> and daily idle duration (LL24: portion of lateral lying posture in a 24-hour window evaluated at 12 PM, noon). Finally, a determination is made if the sow is in a good standing pose <662>. Also calculated was the DLL and DSTA that were the daily difference in LL24 and STA24 (i.e., DLLDay i=125 LL24Day i-LL24Day i-1). RLL and RSTA were the daily ratios in LL24 and STA24 126 (i.e., RLLDay i=LL24Day i/LL24Day i-1). The sow's vulvar region was automatically identified using a deep learning model, e.g., UNET, and segmented <664>.

The vulva volume <666> is computed using the method described above. There is input received from a 3D depth map <668>. Daily vulvar volume (VA24) was defined as the average value of captured vulvar volume within a 24-hour window evaluated at 12 PM. In addition, the DV is the daily difference between two consecutive days' VA24 values, and PV was the daily percentage change in VA24 (PVDay i=132 (VA24Day i-VA24Day i-1)/VA24Day i-1). Day from weaning (DFW) is considered 0 for the first day the sow was moved into the gestation stall and increment by 1 for each following day. Data from the second day after weaning to the day when the onset of estrus was detected for twenty sows were used to train an estrus detection model using a support vector machine (RStudio, 1.2.5033). Response variable "onset of estrus" (OE) is set as 0 (Class weight=1) for each day and set as 1 (Class weight=3) for the day when the onset of estrus was detected. Data from the other six sows were used as test samples. This forms a biological vulvar size record <670> that also forms part of the estrus detection model <672>.

This method uses a robotic imaging system to automatically monitor a sow's behavior and vulvar size. The daily change in the sow's vulvar size, standing, and lateral lying duration can be used to identify the onset of estrus with 95.4% training accuracy and 93.1% testing accuracy. However, behavior patterns may not be a reliable indicator for returned estrus. The presented robotic imaging system can also identify vulvar swollenness around the returned estrus if a sow failed to conceive from the artificial insemination in the previous estrus cycle, and therefore has the potential to significantly reduce labor consumption on estrus detection and pregnancy test and reduce non-production days.

Consequently, the present invention provides powerful tools to determine estrus detection resulting in more productive and efficient sow production. From the foregoing, it can be seen that the present invention accomplishes at least all of the stated objectives.

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means anyone member or combination of members of a particular list.

The terms "invention" or "present invention" are not intended to refer to any single embodiment of the particular invention but encompass all possible embodiments as described in the specification and the claims.

The term "about" as used herein refers to slight variations in numerical quantities with respect to any quantifiable variable. An inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A system for detecting sow physical change around estrus comprising:

a control unit including at least one processor and at least one memory;

at least one three-dimensional measurement device; and a motorized movable mechanism attached to the at least one three-dimensional measurement device, wherein the control unit directs the motorized movable mechanism to obtain physical aspects of a sow on a periodic basis with images from the at least one three-dimensional measurement device;

wherein the motorized movable mechanism includes at least one motor electrically connected to at least one driver in electronic communication with the control unit;

wherein the motorized movable mechanism moves between a plurality of sow stalls to measure sow vulva volume for a plurality of sows located within the plurality of sow stalls with the at least one three-dimensional measurement device; and wherein the motorized movable mechanism includes a motorized trolley mounted within an overhead rail track and a retractable arm attached to the movable motorized trolley and the at least one three-dimensional measurement device.

2. The system for detecting sow physical change around estrus according to claim 1, wherein the physical aspects of the sow are selected from the group consisting of vulva volume, vulva width, vulval length, vulva height, vulva surface area, vulva base area, or vulva color.

3. The system for detecting sow physical change around estrus according to claim 1, wherein the physical aspects of the sow include abdomen movement that is converted to a respiratory rate.

4. The system for detecting sow physical change around estrus according to claim 1, wherein the at least one three-dimensional measurement device includes a 3D camera.

5. The system for detecting sow physical change around estrus according to claim 1, wherein the control unit includes a wireless module for transmitting sow physical data for analysis.

6. The system for detecting sow physical change around estrus according to claim 1, wherein the overhead rail track is in a loop.

7. The system for detecting sow physical change around estrus according to claim 1, wherein the control unit initializes the at least one three-dimensional measurement device, moves the motorized movable mechanism to take images of sow vulva volume, and then transmits sow vulva data for analysis.

8. The system for detecting sow physical change around estrus according to claim 1, wherein the at least one three-dimensional measurement device provides posture recognition information to the control unit to determine a physical position of the sow.

9. The system for detecting sow physical change around estrus according to claim 8, wherein after the determination of a sow being in a standing position, the control unit electrically accesses a deep learning model to ascertain a physical condition of the sow.

10. The system for detecting sow physical change around estrus according to claim 9, wherein after the control unit electrically accesses the deep learning model to ascertain the physical condition of a sow, the control unit electrically accesses the deep learning model to ascertain a vulvar condition of the sow.

11. The system for detecting sow physical change around estrus according to claim 10, wherein after the control unit electrically accesses the deep learning model to ascertain the physical condition and the deep learning model to ascertain the vulvar condition of the sow, existing data and historical records are combined with the physical condition and the vulvar condition to provide a treatment recommendation of the sow.

12. The system for detecting sow physical change around estrus according to claim 11, wherein the physical condition, the vulvar condition, the existing data, and historical records of the sow are electronically transmitted to output selected from the group consisting of an electronic display and a webpage.

13. A method for detecting sow vulva change around estrus utilizing the system of claim 1, the method comprising:

obtaining measurements of sow vulva volume on the periodic basis with the images from the at least one three-dimensional measurement device that is attached to the motorized movable mechanism that is commanded by the control unit having the at least one processor and the at least one memory; and electronically accessing a deep learning model with the control unit to ascertain a physical condition of the sow and electronically accessing a deep learning model to ascertain a vulvar condition of the sow.

14. A method for detecting sow vulva change around estrus utilizing the system of claim 1, the method comprising:

obtaining from the at least one three-dimensional measurement device posture recognition information;

providing posture recognition information to the control unit to determine if a sow is in a standing position;

filtering standing images of sows to find images that provide a full view of a sow's vulva with the control unit; and accessing a deep learning model control to identify and segment at least one image of the sow vulva region and generate a vulva volume value that is utilized to determine if a sow is in estrus with the control unit.

15. A system for detecting sow physical change around estrus comprising:

a control unit including at least one processor and at least one memory;

at least one three-dimensional measurement device; and a motorized movable mechanism attached to the at least one three-dimensional measurement device, wherein the control unit directs the motorized movable mechanism to obtain physical aspects of a sow on a periodic basis with images from the at least one three-dimensional measurement device wherein after the control unit electrically accesses a deep learning model to ascertain a physical condition of a sow, the control unit electrically accesses the deep learning model to ascertain a vulvar condition of the sow;

wherein after the control unit electrically accesses the deep learning model to ascertain the physical condition and the deep learning model to ascertain the vulvar condition of the sow, existing data and historical records are combined with the physical condition and the vulvar condition to provide a treatment recommendation of the sow; and wherein the physical condition and the vulvar condition within a predetermined time period of one to two days is concatenated with the categorical data, that includes at least one of time from weaning, parity number, BCS and sow breed to generate an output based on at least one activation function to determine if estrus is taking place for the sow utilizing a multivariate deep learning model.

* * * * *